US012557961B1

(12) United States Patent
Li et al.

(10) Patent No.: US 12,557,961 B1
(45) Date of Patent: Feb. 24, 2026

(54) DOCKING STATION FOR CLEANING ROBOT AND CLEANING SYSTEM

(71) Applicant: TP-Link Systems Inc., Irvine, CA (US)

(72) Inventors: Wen Li, Shenzhen (CN); Nengfeng Zhang, Shenzhen (CN); Ning Cheng, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/083,397

(22) Filed: Mar. 18, 2025

Related U.S. Application Data

(63) Continuation-in-part of application No. 18/811,668, filed on Aug. 21, 2024.

(51) Int. Cl.
A47L 11/40 (2006.01)
C02F 1/04 (2023.01)

(52) U.S. Cl.
CPC ....... A47L 11/4022 (2013.01); A47L 11/4025 (2013.01); C02F 1/042 (2013.01); C02F 1/043 (2013.01); C02F 1/048 (2013.01); *A47L 2201/028* (2013.01); *C02F 2307/12* (2013.01)

(58) Field of Classification Search
CPC ............. A47L 11/4022; A47L 11/4025; A47L 2201/028; A47L 9/2873; A47L 2201/024; A47L 11/4091; A47L 11/4013; A47L 11/4016; A47L 11/4027; A47L 11/4086; A47L 11/408; C02F 1/042; C02F 1/043; C02F 1/048; C02F 2307/12; C02F 1/02; C02F 1/04; B01D 1/00; B01D 1/0064; B01D 1/30
See application file for complete search history.

(56) References Cited

U.S. PATENT DOCUMENTS

| | | | |
|---|---|---|---|
| 3,587,023 | A | 6/1971 | Goessler |
| 6,156,102 | A | 12/2000 | Conrad |
| 2005/0141106 | A1 | 6/2005 | Lee |
| 2009/0071341 | A1 | 3/2009 | Takemasa |
| 2020/0121153 | A1* | 4/2020 | Letsky .................. A47L 9/2873 |

FOREIGN PATENT DOCUMENTS

| | | |
|---|---|---|
| CN | 203340914 U | 12/2013 |
| CN | 207940784 U | 10/2018 |
| CN | 108862436 A | 11/2018 |
| CN | 210871348 U | 6/2020 |
| CN | 211749314 U | 10/2020 |
| CN | 215725309 U | 2/2022 |

(Continued)

OTHER PUBLICATIONS

English translation of CN-115500752-A, Dec. 23, 2022. (Year: 2022).*

(Continued)

*Primary Examiner* — Joseph W Drodge
(74) *Attorney, Agent, or Firm* — Loeb & Loeb LLP

(57) ABSTRACT

The present disclosure provides docking station for a cleaning robot, including: a wastewater treatment device constructed to collect wastewater generated during cleaning and generate steam from the wastewater; a steam condensing mechanism; wherein the steam discharged from the wastewater treatment device is condensed at the steam condensing mechanism and the condensed steam is fed back to the wastewater treatment device.

20 Claims, 26 Drawing Sheets

(56) References Cited

FOREIGN PATENT DOCUMENTS

| CN | 216221361 | U |   | 4/2022 |   |
|----|-----------|---|---|--------|---|
| CN | 114451813 | A |   | 5/2022 |   |
| CN | 216628432 | U |   | 5/2022 |   |
| CN | 115259513 | A | * | 11/2022 | .............. C02F 1/001 |
| CN | 115316898 | A |   | 11/2022 |   |
| CN | 115413982 | A |   | 12/2022 |   |
| CN | 115500751 | A |   | 12/2022 |   |
| CN | 115500752 | A | * | 12/2022 | .......... A47L 11/4016 |
| CN | 115555381 | A | * | 1/2023 | .............. B09B 3/35 |
| CN | 218279536 | U |   | 1/2023 |   |
| CN | 113739419 | B |   | 4/2023 |   |
| CN | 218884166 | U |   | 4/2023 |   |
| CN | 219438961 | U |   | 8/2023 |   |
| CN | 219450259 | U |   | 8/2023 |   |
| CN | 219742616 | U |   | 9/2023 |   |
| CN | 116849566 | A |   | 10/2023 |   |
| CN | 219835566 | U |   | 10/2023 |   |
| CN | 117357003 | A |   | 1/2024 |   |
| CN | 115413975 | B | * | 4/2024 | .............. A47L 11/28 |
| CN | 115413982 | B | * | 6/2024 | .......... A47L 11/4091 |
| EP | 1916459 | A2 |   | 4/2008 |   |
| WO | 2021075751 | A1 |   | 4/2021 |   |

OTHER PUBLICATIONS

English translation of CN-115259513-A, Nov. 1, 2022. (Year: 2022).*

English translation of CN-115413975-A, Dec. 2, 2022. (Year: 2022).*

English translation of CN-115555381-A, Jan. 3, 2023. (Year: 2023).*

English translation of CN-115413982-B, Jun. 14, 2024. (Year: 2024).*

The principle and characteristics of rotary dehumidification, 6 pages (including English translation) dated Nov. 6, 2021 (pp. 1-6).

USPTO, Final Office Action dated Apr. 23, 2025 for U.S. Appl. No. 18/811,668 (pp. 1-35).

USPTO, Non-final Office Action dated Jan. 13, 2025 for U.S. Appl. No. 18/811,668 (pp. 1-44).

Subtitles for the video titled "Basic Mechanisms: Leadscrew". The video can be found at https://www.youtube.com/watch?v=tkOhH9OUMto.

USPTO, Non-Final Office Action dated Aug. 15, 2025 for U.S. Appl. No. 19/083,419, 22 pages.

* cited by examiner

500-C

500-D

DOCKING STATION FOR CLEANING ROBOT AND CLEANING SYSTEM

CROSS-REFERENCE TO RELATED APPLICATION(S)

This application is a continuation-in-part of U.S. application Ser. No. 18/811,668, filed on Aug. 21, 2024 in the United States Patent and Trademark Office, the disclosure of which is incorporated by reference herein in its entirety.

TECHNICAL FIELD

The present disclosure generally relates the technical field of autonomous cleaning, and specifically, to a docking station for a cleaning robot and a cleaning system comprising a robot and a docking station for the cleaning robot.

BACKGROUND

Autonomous cleaning robots have gained widespread adoption across residential homes, offices, and industrial settings for their ability to perform sweeping and/or mopping tasks on various floor surfaces. These robots, commonly known as robotic vacuum cleaners or floor cleaners, are designed to autonomously navigate and clean designated areas before returning to their charging and docking stations. Upon completion of a cleaning cycle, the cleaning robot returns to the docking station, where it transfers the collected dry debris into a dustbin of the docking station and undergoes a cleaning process for its mopping pads.

Existing docking stations offer the convenience of automatic cleaning of the mopping pads by supplying clean water stored in a clean water tank to rinse the mopping pads and collecting the used water into a wastewater tank. However, the requirement for periodic manual replenishment of the clean water tank and emptying of the wastewater tank may be inconvenient and laborious for users, and the wastewater stored in the wastewater tank for extended periods is prone to developing unpleasant odors, which not only affects the user experience but also necessitates frequent and unpleasant cleaning tasks.

There is a need for an improved mechanism for handling the wastewater generated from cleaning the mopping pads at the docking station to enhance the user experience.

SUMMARY

In view of the above problems, the present disclosure provides a docking station for a cleaning robot and a method of operating a docking station.

According to one embodiment of the present disclosure, a docking station for a cleaning robot comprises: a wastewater treatment device constructed to collect wastewater generated during cleaning and generate steam from the wastewater; a steam condensing mechanism; wherein the steam discharged from the wastewater treatment device is condensed at the steam condensing mechanism and the condensed steam is fed back to the wastewater treatment device.

According to another embodiment of the present disclosure, a cleaning system comprises a cleaning robot and a docking station for the cleaning robot, which comprises a wastewater treatment device constructed to collect wastewater generated during cleaning and generate steam from the wastewater; a steam condensing mechanism; wherein the steam discharged from the wastewater treatment device is condensed at the steam condensing mechanism and the condensed steam is fed back to the wastewater treatment device.

At least based on the above embodiments of the present disclosure, an improved mechanism is configured to handle the wastewater generated from cleaning the mopping pads and to eliminate unpleasant odors generated by distillation of wastewater at the docking station to enhance the user experience while recycling water.

BRIEF DESCRIPTION OF THE DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
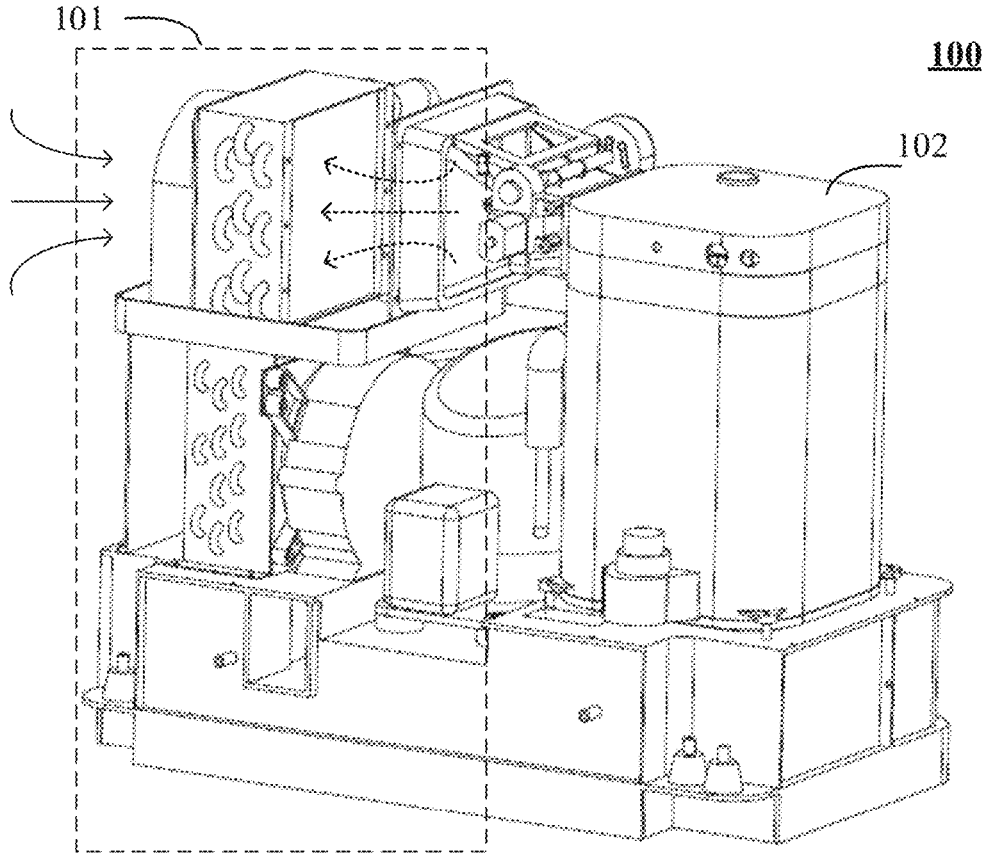
FIG. 1 shows an exemplary schematic diagram of a docking station of a cleaning robot according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "top", "bottom", "internal", "external", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect connections.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis.

In addition, technical features involved in different embodiments of the present disclosure may be combined with each other as long as no conflicts occurs therebetween.

FIG. 1 shows an exemplary schematic diagram of a docking station of a cleaning robot according to an embodiment of the present disclosure.

As depicted in FIG. 1, the docking station 100, according to an embodiment of the present disclosure, is designed with the capability to autonomously process wastewater and produce clean water, which eliminates the need for manual operations of clean water replacement and wastewater discharge. As shown in FIG. 1, the docking station 100 comprises a wastewater tank 102, which collects the wastewater generated from washing the mopping pads of the cleaning robot, e.g., after the robot finishes a current cleaning cycle and docks at the docking station 100. The wastewater may be distilled at the wastewater tank 102 for generating clean water, which may be later stored in a clean water tank of the docking station 100 (which is configured to hold a supply of clean water) and/or supplied to the cleaning robot for a next cleaning cycle.

Accordingly, the wastewater tank 102 incorporates an evaporation or distillation mechanism that facilitates the removal of water content, leading to the concentration of solid waste, which remains at the bottom of the wastewater tank 102. The solid waste is processed, for example, by a rotating blade for scraping or a pulverizing mechanism for breaking it into smaller pieces, which may be discharged as dry debris through a discharge opening provided at the bottom of the wastewater tank 102 and collected in a dust collection box positioned beneath the wastewater tank 102. Consequently, users only need to periodically empty the dust collection box of dry debris, eliminating the need to remove the wastewater tank 102 and dispose the wastewater.

Additionally, the docking station 100 includes a clean water generation device 101, tasked with generating clean water from water vapor, which may be based on one or more of condensation and moisture absorption mechanisms. Consequently, the clean water generation device 101 may receive the water vapor produced by the distillation of the wastewater in the wastewater tank 102 (as indicated by the three dashed-line arrows of FIG. 1) and/or the water vapor originated from the moisture in the air (as indicated by the three solid-line arrows of FIG. 1), which may be used as sources of water vapor for generating clean water. This process results in the creation of clean water, which is then stored in the clean water tank or supplied to the cleaning robot, as mentioned above. In this manner, the wastewater generated from the process of washing the mopping pads and ambient humidity are effectively utilized, allowing users to forgo the disposal of wastewater and manual addition of clean water, thus achieving an efficient recycling of water resources and reducing the operational burden on the user.

It should be noted that FIG. 1 only illustrates the main components of the docking station 100, such as the clean water generation device 101 and the wastewater tank 102 in a schematic way, however, the docking station 100 may also incorporate other structures or components not depicted in FIG. 1. In addition, the structures and connections shown in FIG. 1 are exemplary and alternative configurations may also be used. The present disclosure does not limit the details of the structures and their interconnections for the docking station 100.

In the context of the present disclosure, which employs the distillation approach to purify wastewater for water recycling at the docking station, the inventors have recognized the following problem. Although the distillation process may produce hot steam that is subsequently condensed to create purified liquid water, there is a challenge associated with the disposal of solid waste left after the wastewater has been evaporated. For example, when the wastewater dries up, the solid waste remains at the bottom of the wastewater tank (which is also referred to as an evaporation dish). The solidified waste may be relatively hard and thick, and may not be entirely removable by the rotating blade or the pulverizing mechanism, potentially blocking the discharge opening of the wastewater tank, which is designed for the discharge of solid waste. This may lead to the obstruction of the discharge path of the dry debris, affecting the efficiency of waste removal and may trigger a product fault. In this case, users are compelled to manually inspect the bottom of the wastewater tank to clear the blockage, or return the docking station to the service center for maintenance (e.g., if users have no access to the inside of the wastewater tank), thereby causing inconvenience.

In view of at least the above problem, the overall concept of the present disclosure is to employ a mechanical opening/closing device that operates in conjunction with a mechanism capable of or configured to being actuated, to clear the solidified waste obstructing the discharge opening of the wastewater tank. For example, in case that the mechanism is implemented as a telescopic device, the mechanical opening/closing device may operate horizontally in conjunction with the telescopic device that operates vertically, to clear the solidified waste. It should be noted that various mounting positions and actuation directions of the mechanical opening/closing device and/or the telescopic device are possible, as long as the cooperation of the two devices may allow the telescopic rod to be guided through the opening by extending or retracting its length to penetrate the dirt.

According to embodiments of the present disclosure, the mechanical opening/closing device is exemplified by a valve element at a position corresponding to the discharge opening, and the valve element is operable between an open state for uncovering the discharge opening and a closed state for covering the same. The telescopic device is exemplified by a telescopic mechanism movable between a retracted position and an extended position. For example, the valve element is mounted on an external bottom surface of the wastewater tank, and the telescopic mechanism is disposed above the discharge opening inside the wastewater tank or disposed below the discharge opening outside the wastewater tank, and movable vertically between the retracted position and the extended position, which will be described in details hereinafter. To efficiently prevent the discharge opening from being blocked by the solidified waste generated from the distillation of wastewater, the telescopic mechanism is controlled to transition from the retracted position to the extended position while the valve element is in the open state, thereby breaking through the solidified waste formed at the discharge opening of the wastewater tank.

In this manner, the valve element may be maintained in the closed state and the telescopic mechanism may be maintained in the retracted position when not discharging solid waste, preventing leakage of wastewater and maintaining the sealing. Once the wastewater has evaporated and solidified waste is formed and there is a need to discharge the solid waste, the valve element may be switched to the open state and the telescopic mechanism may be extended to its full length at the extended position, to break up the solidified waste at the valve element, allowing the dry debris, such as the solidified waste which has been crushed by the rotating blade, to be collected into the dust collection box through the unobstructed discharge opening, thus avoiding blockages that would prevent the discharge of dry debris.

It should be noted that, in addition to the telescopic device or equivalently the telescopic mechanism, the mechanism capable of being actuated may be implemented in other ways, such as a high-velocity airflow mechanism or an enclosed pressurization mechanism, among other examples. In this manner, the valve element may be maintained in the closed state and the mechanism may be maintained in the unactuated state (e.g., a first state for which no airflow is directed to the discharge opening) when not discharging solid waste. Once the wastewater has evaporated and solidified waste is formed and there is a need to discharge the solid waste, the valve element may be switched to the open state and the mechanism may be switched to the actuated state (e.g., a second state for which airflow is directed to the discharge opening), to break up the solidified waste at the valve element.

For example, the mechanism capable of being actuated may be implemented as a high-velocity airflow system in addition to or other than the above-mentioned telescopic mechanism. The high-velocity airflow system comprises a pressurization device installed within the system, which generates a high-velocity airflow, and the pressurization device is connected to a conduit leading to a nozzle positioned near the discharge opening. When the solidified waste at the discharge opening needs to be cleared, the pressurization device is activated, directing a high-velocity airflow through the conduit to the nozzle. Meanwhile, the valve element may be opened to expose the discharge opening, to allow the airflow to directly impact the solidified waste formed of the discharge opening. This process effectively breaks up and clears the solidified waste, facilitating its removal through the discharge opening.

As another example, an enclosed pressurization system may be used, which incorporates a pressurization device that, when activated, increases the pressure within the valve chamber. The valve element, which is mounted in correspondence to the discharge opening, is designed to be impermeable to the pressurized environment, ensuring that the force is concentrated on the solidified waste. Upon opening the valve element, the pressurized air is released, exerting a powerful force against the accumulated waste, such that the waste may be cleared efficiently after the mechanism is actuated.

It should be noted that the above mentioned actuatable mechanisms based on high-velocity airflow or enclosed pressurization, as well as other types of actuatable mechanisms are also possible. In the implementations involving a pressurization device connected to a guide tube, when the pressurization device is activated, it may emit a high-speed air jet through the guide tube. When the valve element is opened, the guide tube is connected to the valve opening and forms a seal. At this point, high-speed air is jetted into the valve cavity or continuous pressure is applied until the dirt at the discharge opening is broken through with the aid of the airflow or increased pressure.

The process of wastewater treatment and solid waste discharge at the docking station is described as follows. First, the cleaning robot returns to the docking station to undergo a mopping pad cleaning procedure, which generates wastewater. In this process, the dry debris collected by the cleaning robot during its cleaning mission is also transferred to the dust collection box of the docking station. Then, a heater is started to induce evaporation of the wastewater and the hot steam generated is directed into the clean water generation device, where it condenses to form clean, distilled liquid water. During the evaporation or distillation, solidified waste is generated at the bottom of the wastewater tank, and the valve element operates in conjunction with the telescopic mechanism to break through the solidified waste formed at the discharge opening of the wastewater tank, such that the dry debris generated by the rotating blade or the pulverizing mechanism may be easily discharged through the cleared discharge opening of the wastewater tank and collected in the dust collection box by gravity.

Figure 2:
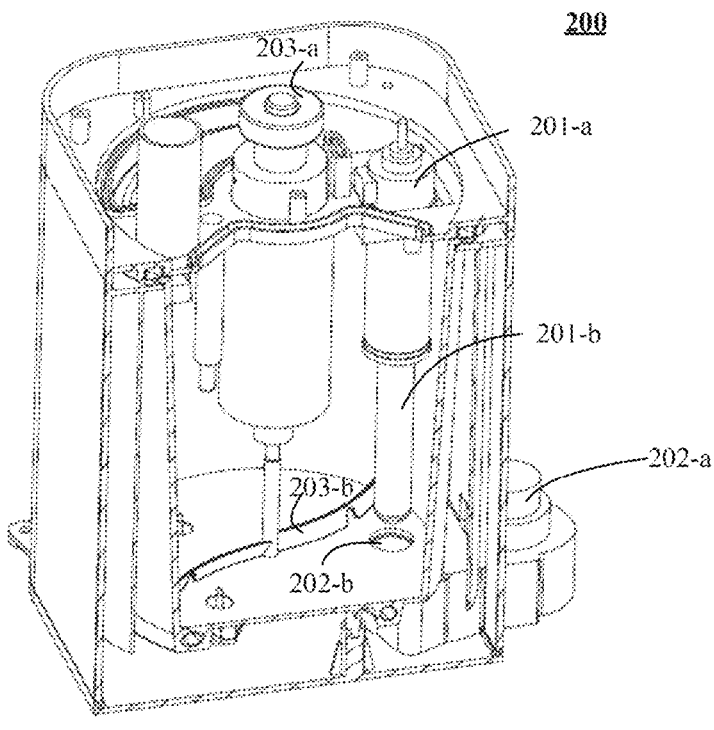
FIG. 2 shows an exemplary schematic diagram of a waste discharge device for use in a docking station according to an embodiment of the present disclosure.

FIG. 2 shows an exemplary schematic diagram of a waste discharge device for use in a docking station according to an embodiment of the present disclosure.

With reference to FIG. 2, the waste discharge device 200 is positioned in relation to the wastewater tank to efficiently handle the solidified waste resulting from the distillation. As depicted, the waste discharge device 200 comprises a telescopic mechanism, which includes a first actuator 201-a that provides the motive power for the extension and retraction of the telescopic mechanism, and a push-pull rod 201-b that moves in response to the actuation of the first actuator 201-a. In this example, the push-pull rod 201-b moves vertically to retract or extend its length. When there is no need to discharge the dry debris through the discharge opening, the push-pull rod 201-b is in the retracted position, whereas it extends to the extended position to break through the solidified waste when necessary.

The waste discharge device 200 further includes a valve element, comprising a second actuator 202-a that supplies the motive power needed for the actuation of the valve element, and a movable part 202-b that controls the opening and closed states of the valve element in response to the actuation of the second actuator 202-a. When there is no need to discharge the dry debris through the discharge opening, the movable part 202-b is in the closed state to seal the liquid, whereas it switches to the open state to allow the push-pull rod 201-b to extend through the discharge opening, thereby shattering the dried mud formed at the discharge opening of the wastewater tank and clearing the discharge path of dry debris.

The waste discharge device 200 further includes a waste crushing mechanism, which includes a third actuator 203-a that supplies the motive power for scraping or pulverizing the solidified waste, and a set of blades 203-b that rotates under the actuation of the third actuator 203-a to crush the waste into smaller pieces, fine particles or powder. In this way, the dry debris may be easily discharged through the cleared discharge opening.

In this embodiment, the first actuator 201-a comprises a first motor and a transmission mechanism mechanically connected to the first motor, wherein the transmission mechanism may be configured to translate a rotational movement of the first motor into a linear movement of the first actuator 201-a. In an example, the transmission mechanism may be implemented by using a gear engaged with a threaded rod, to convert rotational motion into linear motion. Accordingly, the push-pull rod 201-b is mechanically connected to the first actuator 201-a and driven by the linear movement of the first actuator 201-a to move vertically between the retracted position and the extended position.

Accordingly, the solidified waste generated from the distillation of wastewater and formed at the discharge opening of the wastewater tank may be shattered, without the requirements of checking and clearing the blockage of the discharge opening manually or the requirements of visiting a maintenance facility for cleanup, improving the efficiency of dry debris management and enhancing user experience.

Figure 3:
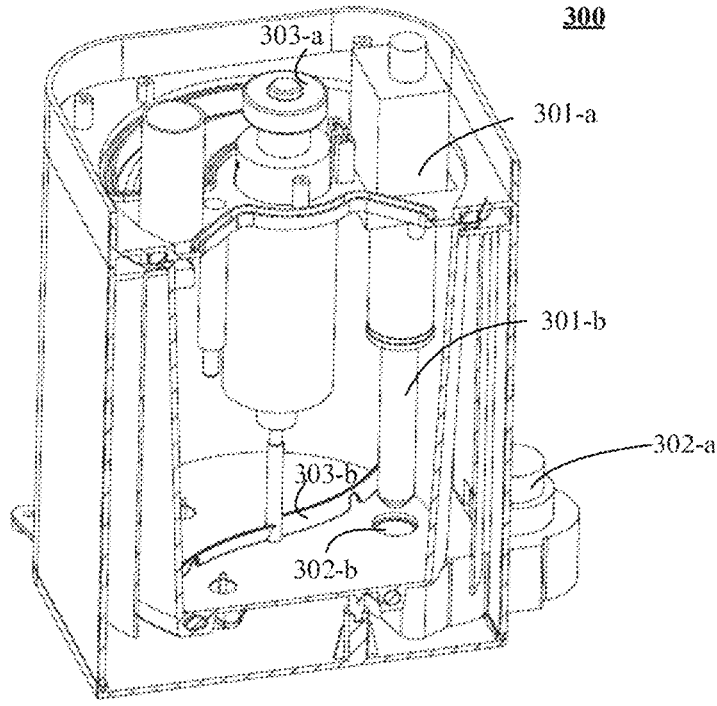
FIG. 3 shows an exemplary schematic diagram of a waste discharge device for use in a docking station according to another embodiment of the present disclosure.

FIG. 3 shows an exemplary schematic diagram of a waste discharge device for use in a docking station according to another embodiment of the present disclosure.

Referring to FIG. 3, the waste discharge device 300 is also positioned in relation to the wastewater tank to efficiently handle the solidified waste resulting from the distillation process. Similar to the waste discharge device 200 depicted in FIG. 2, the waste discharge device 300 also comprises a telescopic mechanism, which includes a first actuator 301-a that provides the motive power for the extension and retraction of the telescopic mechanism, and a push-pull rod 301-b that moves in response to the actuation of the first actuator 301-a. In this example, the push-pull rod 301-b also moves vertically to retract or extend its length. The waste discharge device 300 further includes a valve element, which comprises a second actuator 302-a and a movable part 302-b controlling the opening and closed states of the valve element in response to the actuation of the second actuator 302-a. Furthermore, the waste discharge device 300 includes a waste crushing mechanism, which includes a third actuator 303-a and a set of blades 303-b rotates under the actuation of the third actuator 303-a to crush the waste into smaller pieces, fine particles, or powder.

In this embodiment, the valve element and the waste crushing mechanism are identical to the corresponding components depicted in FIG. 2, and details for the components are omitted here. The distinction between FIG. 2 and FIG. 3 lies in the design of the telescopic mechanism. Herein, the vertical movement of the telescopic mechanism is achieved by use of an electromagnet and a spring. When the electromagnet is not energized, it does not generate a magnetic attraction force, and the push-pull rod is pushed to the bottom (e.g., the extended position) by the spring force. Conversely, when the electromagnet is energized, it produces the magnetic attraction force that exceeds the spring force, drawing the push-pull rod upwards (e.g., the retracted position) and compressing the spring, thereby facilitating the extension and retraction of the telescopic mechanism in the vertical direction.

For example, the first actuator 301-*a* is realized by a combination of an electromagnet that generates a magnetic attraction force when energized, and a spring element that generates an elastic force when compressed. Accordingly, the magnetic push-pull rod 301-*b* is mechanically connected to the spring element and is driven by the magnetic attraction force of the electromagnet or the elastic force of the spring element to move vertically between the retracted position and the extended position. For example, when it is needed to discharge the dry debris (and possibly needed to break through the dried waste formed at the discharging opening of the wastewater tank), the electromagnet is not energized, and the elastic force of the spring element causes the magnetic push-pull rod 301-*b* to move to the extended position to cross over and clear the discharging opening, whereas when there is no need to discharge the dry debris, the electromagnet is energized and the generated elastic force of the spring element, which is greater than the elastic force of the spring element, causes the magnetic push-pull rod 301-*b* to return to the retracted position.

It is understood that the above example is described taking the electromagnetic attraction force generated when the electromagnet is energized as an example. However, in other examples, the switching between the retracted position and the extended position may also be achieved by setting opposite polarities on the electromagnet and the magnetic push-pull rod, utilizing the combined action of electromagnetic repulsion force and spring force. The present disclosure does not limit the specific control manners of the electromagnet.

Accordingly, the solidified waste generated at the discharge opening of the wastewater tank may be shattered and effectively cleared without manual operations.

Figure 4A:
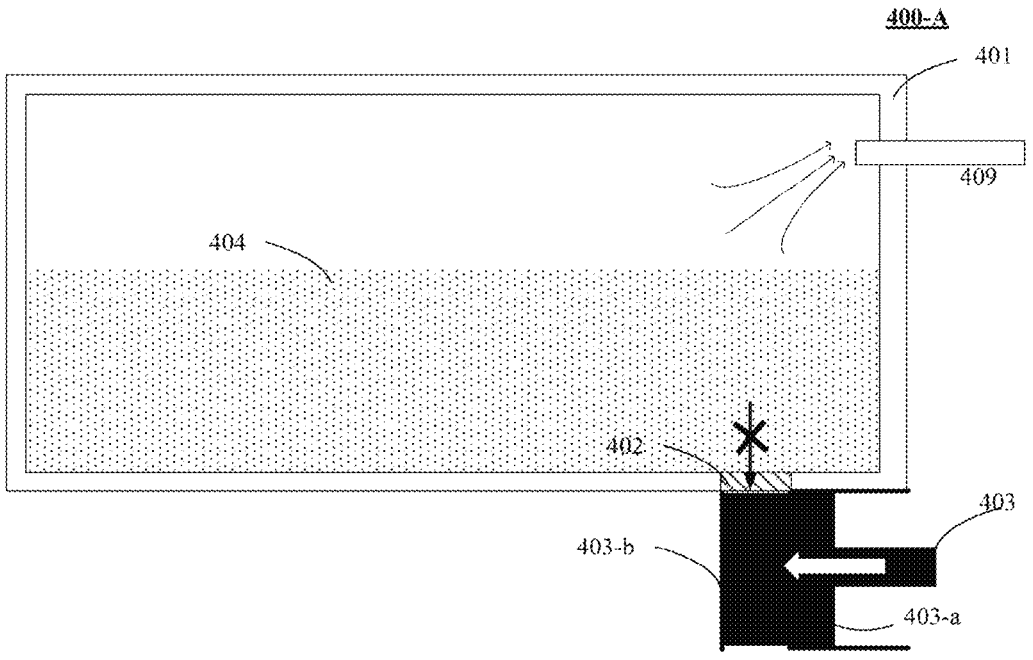
FIGS. 4A-4B show an exemplary schematic diagram of different operation modes of a waste discharge device according to an embodiment of the present disclosure.
Figure 4B:
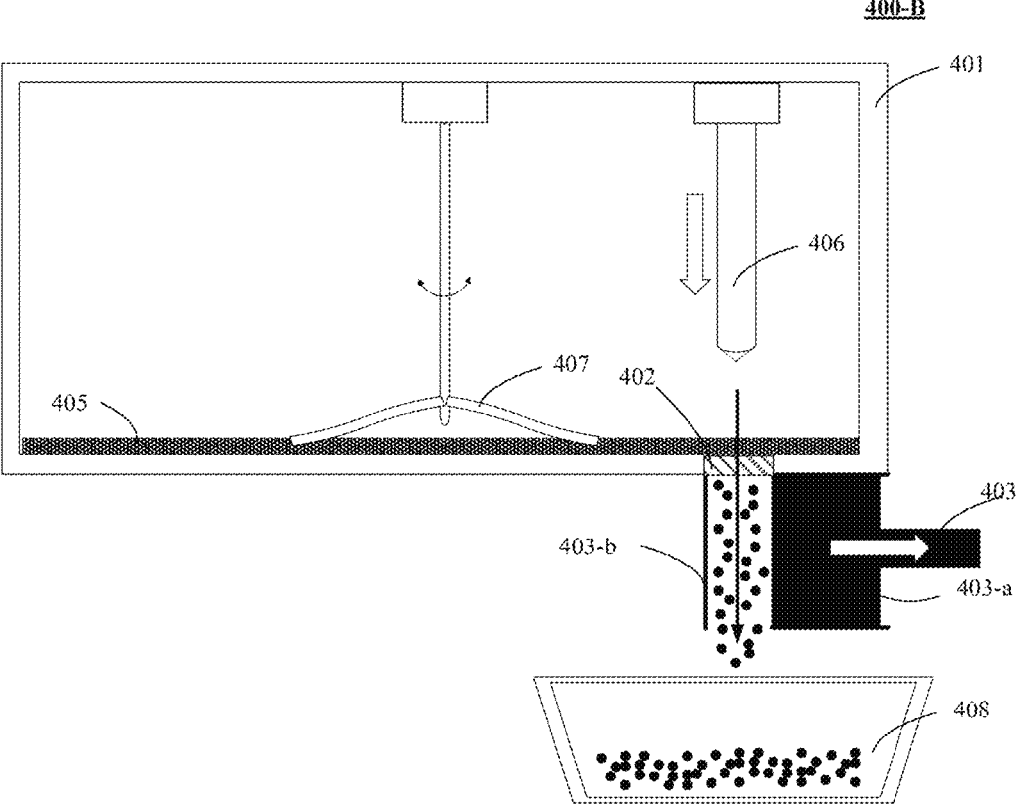

FIGS. 4A-4B show an exemplary schematic diagram of different operation modes of a waste discharge device according to an embodiment of the present disclosure.

In the present embodiment, the valve element as mentioned above is implemented by a solenoid valve, enabling horizontal opening and closed control of the valve element to regulate its open state (as illustrated in FIG. 4B) and closed state (as depicted in FIG. 4A).

FIG. 4A illustrates the waste discharge device in a non-charge mode 400-A, for which no dry debris is discharged. As depicted, the wastewater tank 401 collects wastewater 404 generated from cleaning the mopping pads of the cleaning robot, and then heats the wastewater 404 using a heater (not shown) to produce hot steam that is expelled through a pipe 409 to the clean water generation device, which generates the clean water from the water vapor of the hot steam. The wastewater tank 401, as described earlier, has a discharge opening 402 at the bottom for discharging the solid waste produced after distillation. In the non-charge mode 400-A, the solenoid valve 403 is energized, the piston 403-*a* is propelled by magnetic force to make a tight seal with the valve inner wall 403-*b*, closing the valve to cover the discharge opening and preventing liquid from flowing through the opening.

FIG. 4B illustrates the waste discharge device in a charge mode 400-B, for which the dry debris is discharged. As depicted, the wastewater 404 is evaporated to form a layer of dried mud 405 at the bottom of the wastewater tank 401, which may adhere to the discharge opening 402 and obstruct the passage for discharging dry debris. In the charge mode 400-B, the solenoid valve 403 is de-energized, the piston 403-*a* disengages from contact with the valve inner wall 403-*b*, placing the solenoid valve in an open state to uncover the discharge opening. In this case, the telescopic mechanism 406 may be controlled to transition from a retracted position to an extended position, breaking through the solidified waste formed at the discharge opening, thereby clearing the discharge opening 402. Accordingly, a set of blades 407 may rotate to pulverize the dried mud 405, allowing the crushed waste to be discharged into the dust collection box 407 through the cleared discharge opening 402 by gravity.

It is understood that the above description takes a normally open solenoid valve 403 as an example, but a normally closed solenoid valve or other types of electronically controlled valves may also be employed to control the horizontal opening and closed states of the valve element. The present disclosure is not limited to the specific type of solenoid valve used. It should be noted that the sizes, positional relationships, and mounting positions of the components depicted in FIGS. 4A-4B are also exemplary and illustrative. Alternative arrangements and configurations are also possible. Furthermore, the lengths of the blades shown in FIGS. 4A-4B are provided as illustrative examples. In practice, the length of the blades may be extended across the entire bottom surface of the wastewater tank to effectively scrape and remove the dried waste formed across the entire bottom surface.

However, the inventors have observed that the solenoid valve depicted in FIGS. 4A-4B is more suitable for clean liquids free of solid impurities. In scenarios involving the discharge of solid waste, such solids may adhere to the mating surfaces of the valve, such as the valve inner wall 403-*b*, causing the originally smooth contact surfaces to become rough. Consequently, when the valve is switched to its closed state, gaps may remain between the mating surfaces, compromising the sealing integrity. Therefore, an optimized valve structure is required to address the need for solid waste discharge, ensuring effective control of its opening and closed states while maintaining sealing performance.

Figure 5A:
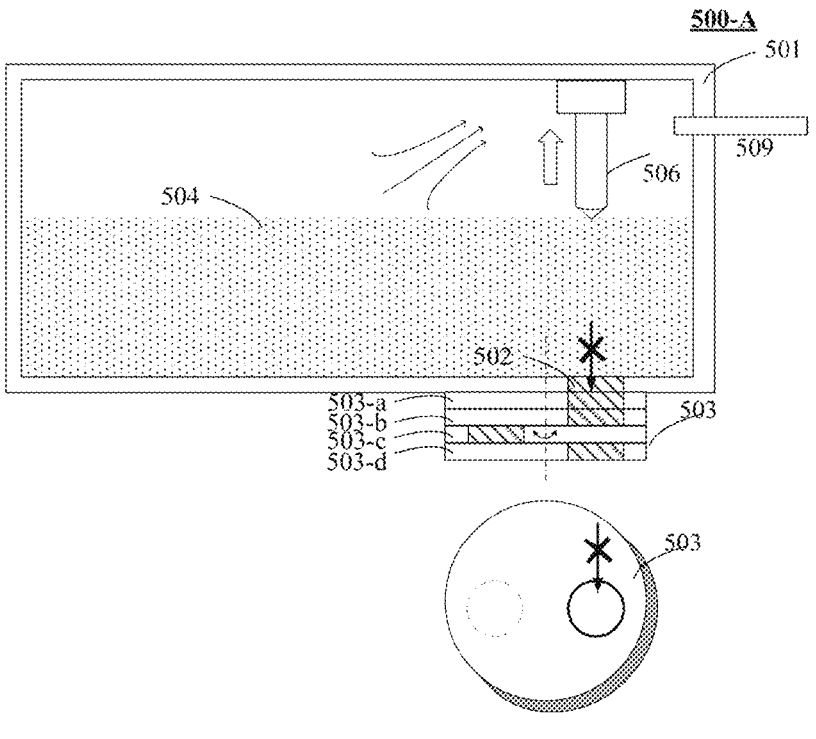
FIGS. 5A-5B show an exemplary schematic diagram of different operation modes of a waste discharge device according to another embodiment of the present disclosure.
Figure 5B:
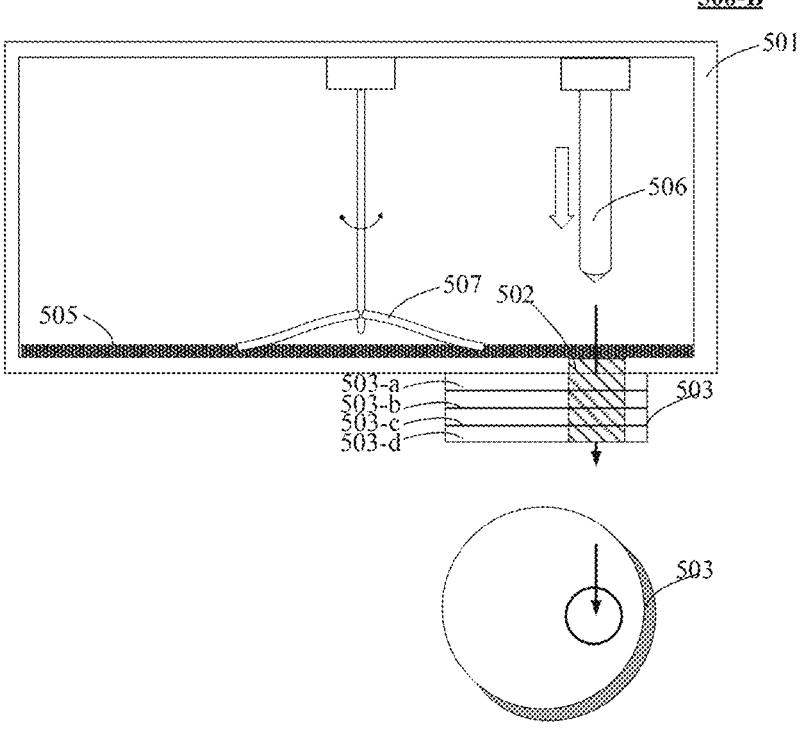

FIGS. 5A-5B show an exemplary schematic diagram of different operation modes of a waste discharge device according to another embodiment of the present disclosure.

In the present embodiment, the valve element is implemented by a flat valve (or referred to as a planar valve), enabling horizontal opening and closed control of the valve element to be in open state (as illustrated in FIG. 5B) or closed state (as depicted in FIG. 5A).

FIG. 5A illustrates the waste discharge device in a non-charge mode 500-A, for which no dry debris is discharged. As depicted, the wastewater tank 501 collects and heats wastewater 504 to produce hot steam that is expelled through a pipe 509. The wastewater tank 501, as described earlier, has a discharge opening 502 at the bottom for discharging the solid waste produced after distillation. In the non-charge mode 500-A, the planar valve 503 is controlled in the closed state to cover the discharge opening and prevent liquid leakage, and the telescopic mechanism 506 is maintained in its retracted position.

FIG. 5B illustrates the waste discharge device in a charge mode 500-B, for which the dry debris is discharged. As depicted, the wastewater 504 is evaporated to form a layer of dried mud 505 at the bottom of the wastewater tank 501, which may adhere to the discharge opening 502 and obstruct the passage for discharging solid waste. In the charge mode 500-B, the valve element 503 is controlled in its open state to uncover the discharge opening. Although the discharge opening may be uncovered, there may be the layer of dried mud 505 obstructing the passage for discharging solid waste through the discharge opening 502. In this case, the telescopic mechanism 506 may be controlled to transition from a retracted position to an extended position, breaking through the solidified waste formed at the discharge opening. Accordingly, a set of blades 507 may rotate to pulverize the dried mud 505, allowing the crushed waste to be discharged through the cleared discharge opening 502 by gravity.

According to the embodiment of the present disclosure, utilizing gravity to facilitate the descent of the crushed dry debris into the dust collection box eliminates the need for complex vacuum systems, thereby effectively reducing the size and cost of the docking station, as well as diminishing the noise associated with waste extraction. This approach achieves waste discharge and collection in a simple and efficient manner.

It is understood that the telescopic mechanism 506 and waste crushing mechanism (including the blades 507) of FIGS. 5A and 5B are identical to the corresponding structures depicted in FIGS. 4A and 4B, and details for the components are omitted here. The distinction between FIGS. 4A and 4B and FIGS. 5A and 5B lies in the design of the valve element. Herein, the valve element 503 implemented by a flat valve or a planar valve, which includes several circular plates arranged in a stack along a common axis, may effectively address the abrasion issue for the mating surfaces of the solenoid valve involved in the solid waste discharge, ensuring effective control of its opening and closed states while maintaining sealing.

As depicted, the valve element 503 comprises a first stationary plate 503-*b* and a second stationary plate 503-*d*, each of the first and second stationary plates 503-*b* and 503-*d* has a through-hole aligned with the discharge opening 502. Further, the valve element 503 includes a rotatable plate 503-*c* interposed between the first and second stationary plates 503-*b* and 503-*d*, the rotatable plate 503-*c* also has a through-hole. It should be noted that the rotatable plate 503-*c* may rotate along the common axis of the valve element 503 relative to the first and second stationary plates 503-*b* and 503-*d*, and it switches between an alignment with the through-holes of the first and second stationary plates 503-*b* and 503-*d* and a misalignment with the through-holes of the first and second stationary plates 503-*b* and 503-*d* during rotation. For example, the alignment of the through-hole of the rotatable plate 503-*c* with the through-holes of the first and second stationary plates 503-*b* and 503-*d* controls the open state of the valve element 503, which corresponds to the charge mode 500-B in FIG. 5B, while the misalignment of the through-hole of the rotatable plate 503-*c* with the through-holes of the first and second stationary plates 503-*b* and 503-*d* controls the closed state of the valve element 503, which corresponds to the non-charge mode 500-A in FIG. 5A.

Optionally, the valve element 503 further comprises a sealing plate 503-*a* interposed between the external bottom surface of the wastewater tank 501 and the first stationary plate 503-*b*, which also has a through-hole aligned with the discharge opening 502.

Specifically, in the embodiment of the present disclosure, the wastewater tank 501, which is used to evaporate wastewater to produce steam, may be implemented as an aluminum evaporation dish. Given that the surface of the aluminum evaporation dish may be relatively rough with some pits, direct contact with the stationary plate 503-*b* of the valve element 503 might result in poor sealing. To address this, the sealing plate 503-*a* may be implemented as a layer of rubber material to achieve an interference fit sealing.

Additionally, the rotatable and stationary plates 503-*b* through 503-*d* may be made of smooth-surfaced materials, allowing for a minimal gap that effectively prevents dust intrusion, thereby avoiding wear on the plates due to dust particles that could compromise the sealing performance. Furthermore, the stationary plates 503-*b* and 503-*d* are selected to have hydrophobic properties, coupled with its strength properties, which further prevents seepage of wastewater from the evaporation dish into the body of the valve element 503. Additionally, between the different layers of the valve element 503, a hydrophobic lubricant is applied, leveraging the surface tension of the lubricant to provide a waterproof seal.

Consequently, a through-hole is created at the edge of each of these four circular plates of the valve element 503. When it is not needed to uncover the discharge opening 502 of the wastewater tank, the through-hole of the rotatable plate 503-*c* remains misaligned with the through-holes of the remaining plates of the valve element 503 (as shown in FIG. 5A), covering the discharge opening 502. On the other hand, when it is necessary to uncover the discharge opening 502, a motor drives the rotation of the rotatable plate 503-*c* (for example, in a counterclockwise direction), and the motor stops when the through-holes of the four plates of the valve element 503 align (as shown in FIG. 5B), uncovering the discharge opening 502. To cover the discharge opening again, the motor may drive the rotation of the rotatable plate 503-*c* in the opposite direction (for example, in a clockwise direction). With the aid of the motor driving, the state of alignment for the through-holes of the four plates may be switched between a misaligned state and an aligned state, allowing the control of the closed and open states of the valve element.

It is understood that the above described control methods and rotation directions of the motor and the rotatable plate are provided as examples, and other suitable control methods may be employed, as long as the alignment state of the through-holes of the four plates may be switched by the actuation of the motor. The present disclosure does not limit the specific mode of operation and direction of the rotation.

In this manner, the issue of damage to the valve element in solid waste discharge scenarios is resolved. By adopting the four-layer flat valve structure as described, there will be no accumulation of solid waste on the valve element during the switching between open and closed states, which would otherwise wear down the components, thereby reducing their scaling performance or lifespan. This improved valve design of the present disclosure ensures a durable and reliable sealing mechanism suitable for environments involving the handling of solid waste generated from distillation of wastewater for water recycling at docking stations, and increase the lifespan of the valve elements.

Figure 5C:
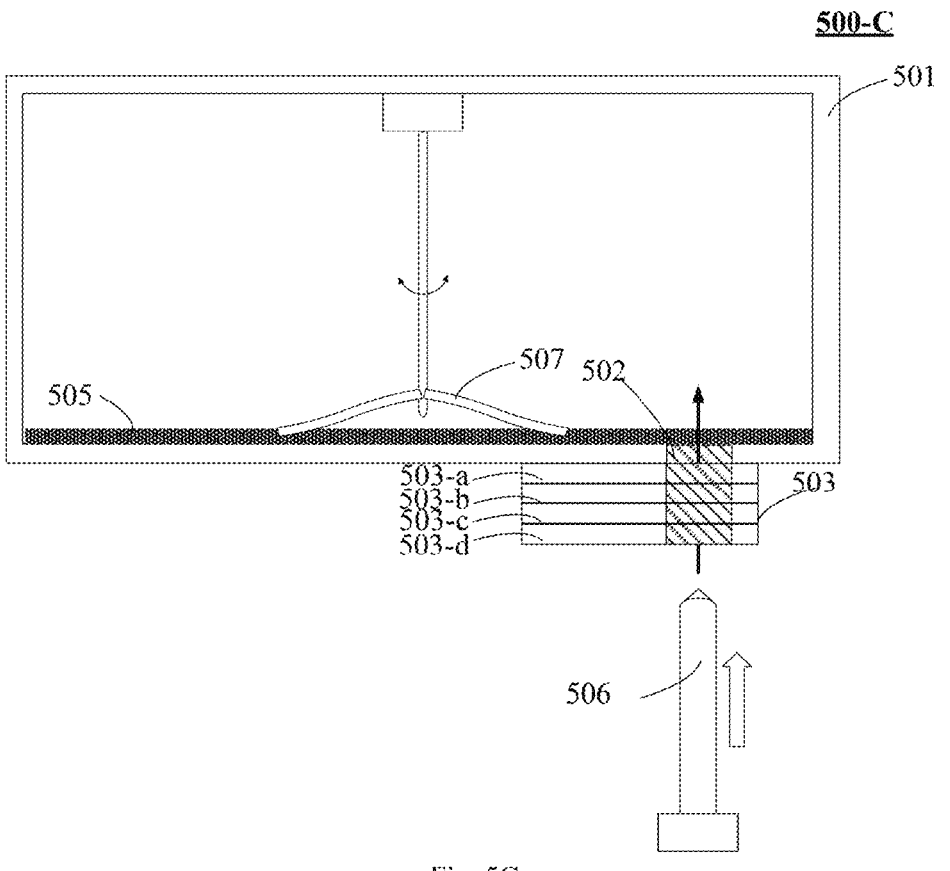
FIGS. 5C-5D show exemplary schematic diagrams of different positions of the discharge opening, and different mounting positions and orientations of the valve element and telescopic mechanism according to embodiments of the present disclosure.
Figure 5D:
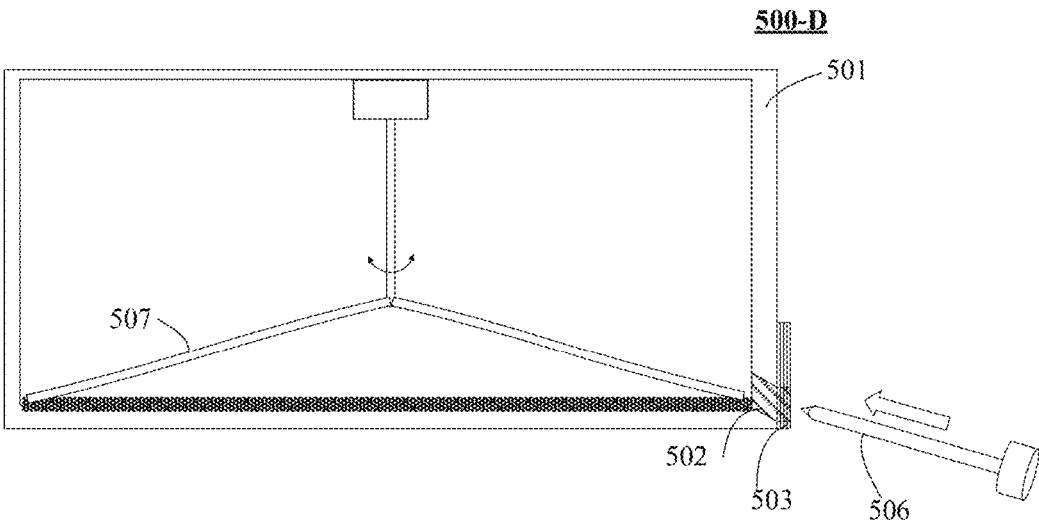

FIGS. 5C-5D show exemplary schematic diagrams of different positions of the discharge opening, and different mounting positions and orientations of the valve element and telescopic mechanism according to embodiments of the present disclosure.

As mentioned above, various mounting positions and actuation directions of the mechanical opening/closing device (e.g., the valve element) and/or the telescopic device (e.g., the telescopic mechanism) are possible, as long as the cooperation of the two devices may allow the telescopic rod to be guided through the opening by extending or retracting its length to penetrate the dirt. For example, the discharge opening of the wastewater tank may be located on the external bottom surface of the wastewater tank (such as those depicted in FIGS. 2-5C), and it may also be located on the bottom haft of the external sidewall surface of the wastewater tank (such as that depicted in FIG. 5D), as long as the discharge opening is located at the bottom half of the wastewater tank for discharging solidified waste. Accordingly, the valve element may also be mounted at various positions to match the location of the discharge opening. In addition, the telescopic mechanism may be not only mounted above the wastewater tank (also referred to as the evaporation dish) but may also be mounted below or around it, and the telescopic mechanism may be mounted inside or outside the wastewater tank, as long as that the telescopic mechanism may operate to switch to its extended state to break through the dried waste after the evaporation is completed. By utilizing the centrifugal force generated by the rotating blades stirring the dirt, it is possible to achieve the discharge of waste by gravity based on various combinations of the mounting positions and actuation directions of the valve element and/or the telescopic mechanism.

FIG. 5C illustrates the waste discharge device in a charge mode 500-C, for which the dry debris is discharged. In this embodiment, the valve element, the telescopic mechanism and the waste crushing mechanism are identical to the corresponding components depicted in FIG. 5B, and details for the components are omitted. The distinction between FIG. 5B and FIG. 5C lies in the mounting position and actuation direction of the telescopic mechanism. Herein, the telescopic mechanism 506 is mounted outside the wastewater tank 501, and moves upwards to switch to its extended position by extending its length to break through the dried waste while the valve element 503 is in the open state.

In FIG. 5C, preferably, a protective or sealing device (such as a protective film) may be installed or formed above the telescopic mechanism 506 to prevent debris falling by gravity from landing on the telescopic mechanism 506, causing wear, contamination or other damages to mechanical parts of the telescopic mechanism 506.

FIG. 5D illustrates the waste discharge device in a charge mode 500-D, for which the dry debris is discharged. In this embodiment, the valve element, the telescopic mechanism and the waste crushing mechanism are identical to the corresponding components depicted in FIG. 5B and FIG. 5C, and details for the components are omitted. The distinction between FIG. 5D and FIGS. 5B-5C also lies in the mounting position and actuation direction of the telescopic mechanism. Herein, the telescopic mechanism 506 is mounted outside the wastewater tank 501, and but does not move in a vertical direction to break through the dried waste. For example, the telescopic mechanism 506 moves in an obliquely upward direction to switch to its extended position by extending its length, to break through the solidified waste formed at the discharge opening (located on the bottom part of the sidewall of the wastewater tank as depicted) of the wastewater tank while the valve element 503 is in the open state.

In accordance with the present disclosure, the valve element and the telescopic mechanism are designed with versatility in their positioning and orientation to accommodate various operational requirements, which offers multiple placement and actuation options that enhance the efficiency of the waste discharge process.

Figure 6:
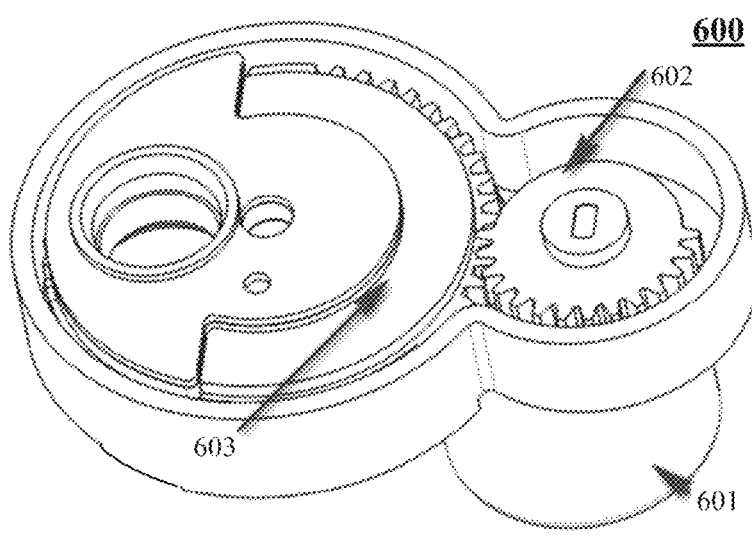
FIG. 6 shows an exemplary schematic diagram of an actuating mechanism of a valve element according to an embodiment of the present disclosure.

FIG. 6 shows an exemplary schematic diagram of an actuating mechanism of a valve element according to an embodiment of the present disclosure.

As depicted, the valve element 600 comprises a second actuator, which serves to provide the necessary rotational force for the rotatable plate, for example, to drive the rotatable plate rotate relative to the stationary plates, as described in FIGS. 5A and 5B. As depicted in FIG. 6, the second actuator includes a second motor 601 and a second transmission mechanism 602 that is mechanically connected to the second motor 601. The second transmission mechanism 602 may be implemented using a gear drive and other transmission mechanism, and may be configured to drive the rotational movement of the rotatable plate 603 in relation to the stationary plates to control the open and closed states thereof.

Furthermore, the valve element 600 also includes a position sensor (not illustrated) that is designed to detect the alignment of the through-hole of the rotatable plate with the through-holes of the first and second stationary plates. Accordingly, the second motor 601 is controlled based on the outcome of this detection, as previously described in combination with FIGS. 5A and 5B. For instance, the detection principle may involve embedding magnets in the gear mechanism and utilizing a Hall sensor for detecting whether all the through-holes align with each other for controlling the motor.

Figure 7:
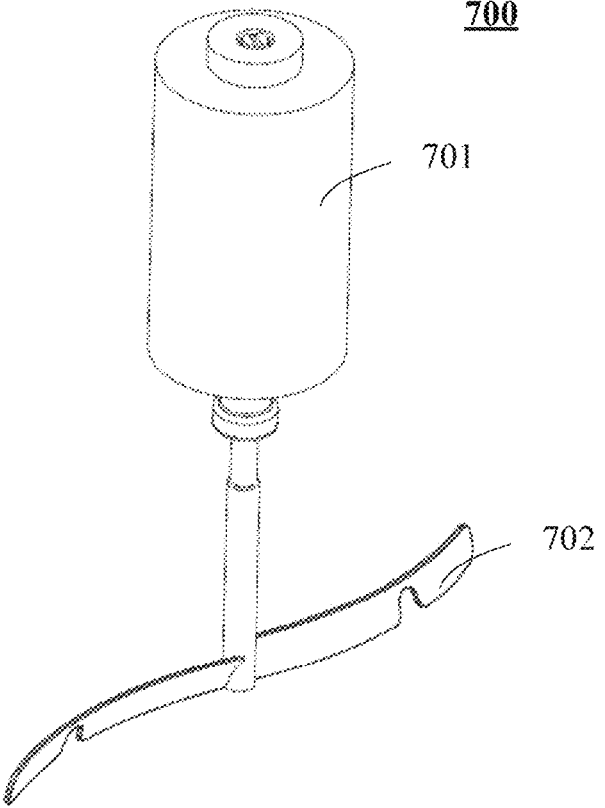
FIG. 7 shows an exemplary schematic diagram of a waste crushing mechanism according to an embodiment of the present disclosure.

FIG. 7 shows an exemplary schematic diagram of a waste crushing mechanism according to an embodiment of the present disclosure.

As depicted, the waste discharge device also includes a waste crushing mechanism 700 mounted inside the wastewater tank. The waste crushing mechanism 700 is similar to the corresponding components depicted in FIGS. 2 through 5B.

According to embodiments of the present disclosure, the waste crushing mechanism 700 comprises a third motor 701 that is configured to provide the rotational torque necessary for the operation of the mechanism, for crushing the waste into smaller pieces, fine particles or powder. The waste crushing mechanism 700 further comprises a set of blades configured to be driven by the rotational force provided by the third motor 701, to scrape off the solidified waste formed on the internal bottom surface of the wastewater tank.

In an example, a current detection mechanism is incorporated into a motor drive circuit. If there is stubborn dirt that gets stuck and causes the blades to jam, which may result in an increase in the current flowing through the motor. In such cases, this surge in current may be detected and as a response, the motor is driven in reverse for a short distance and then accelerated again to break through the obstruction. This approach ensures that the motor may handle tough debris without causing damage or requiring manual intervention.

The designed structure ensures that the solidified waste, which is a byproduct of the wastewater distillation process, is effectively crushed into smaller pieces and discharged through the discharge opening of the wastewater tank by way of gravity feed. In an example, the blades are angled at a predetermined angle relative to the bottom surface of the wastewater tank. This angle is selected to ensure that the blades effectively removes the solid waste from the bottom of the wastewater tank, facilitating the waste discharge process.

With reference back to FIG. 1, the docking station 100, which incorporates the above-described waste discharge device, is described in further detail.

According to embodiments of the present disclosure, the docking station for a cleaning robot may comprise a clean water tank configured to store a supply of clean water. In addition, the docking station may further comprise a wastewater tank (such as the wastewater tank 102 of FIG. 1), which is configured to collect wastewater generated from washing one or more mopping pads of the cleaning robot to be distilled for generating the clean water. As mentioned, the wastewater tank has a discharge opening at its bottom for discharging solidified waste generated from distillation of the wastewater.

According to embodiments of the present disclosure, the docking station and the cleaning robot may be provided as a complete package in a form of a cleaning system. In the cleaning system, the cleaning robot may perform a cleaning task for the users, such as sweeping and/or mopping tasks on various floor surfaces. Accordingly, the docking station may provide docking functions for the cleaning robot, such as recharging a battery of the cleaning robot, collecting dry debris from the cleaning robot into a dustbin of the docking station and performing a cleaning process for the mopping pads of the cleaning robot. Details of the structure of the cleaning robot is known to those skilled in the art and omitted herein.

As mentioned above in combination with FIGS. 2-7, the docking station may further comprise a waste discharge device having a valve element and a mechanism that may be actuated. The valve element is mounted at a position corresponding to the discharge opening, and it is operable in an open state for uncovering the discharge opening or a closed state for covering the discharge opening. The mechanism may be configured to be actuated while the valve element is in the open state to break through solidified waste formed at the discharge opening. For example, the mechanism may be implemented as a telescopic mechanism movable between a retracted position and an extended position relative to the discharge opening. For example, the valve element may be mounted on an external bottom surface of the wastewater tank, and the telescopic mechanism may be disposed above the discharge opening inside the wastewater tank or disposed below the discharge opening outside the wastewater tank, and movable vertically between the retracted position and the extended position. Accordingly, the telescopic mechanism may be controlled to move from the retracted position to the extended position while the valve element is in the open state to break through the solidified waste formed at the discharge opening of the wastewater tank.

According to an embodiment of the present disclosure, the docking station further comprises a heater mounted on an external side wall of the wastewater tank and configured to heat the collected wastewater for generating the clean water to be stored in the clean water tank. For instance, the heater could take the form of a heating strip or any other suitable heating device. Furthermore, the docking station may include a fan mechanism installed inside the wastewater tank, which enhances air circulation and accelerates the evaporation process of the wastewater, thereby improving the efficiency of clean water production.

In this embodiment, the docking station further comprises a temperature sensor configured to detect a temperature of the wastewater heated in the wastewater tank. In this case, the heater is controlled based on the detected temperature to maintain the temperature of the heated wastewater at a predetermined temperature below a boiling point, for example, using a Proportion Integration Differentiation (PID) algorithm. For example, the heater may be controlled in various ways, such as by controlling the heating power of the heater, or by controlling the connection or disconnection with its power supply, thereby enabling precise temperature control of the wastewater. This ensures that the wastewater undergoes evaporation at a temperature that prevents boiling, thereby effectively avoiding the spattering of solid particles that may result from boiling (which may otherwise pass through the pipe of the wastewater tank for expelling hot steam and cause contamination to the purified water) and avoiding the generation of unpleasant odors that may result from burning or charring.

According to another embodiment of the present disclosure, the docking station further comprises the clean water generation device (such as the clean water generation device 101 of FIG. 1) configured to generate the clean water from the water vapor using one or both of a condensation mechanism and a moisture absorption mechanism.

In an example of this embodiment, the condensation mechanism comprises one or more of a compressor cooling mechanism, a semiconductor cooling mechanism, an air-cooling mechanism, and a liquid cooling mechanism among other examples, such that the condensed liquid water may be collected in the clean water tank. In another example of this embodiment, the moisture absorption mechanism comprises hygroscopic materials for absorbing the water vapor and a heater for heating the hygroscopic materials for generating liquid water, which may be collected in the clean water tank.

Understandably, the process of generating clean water by the clean water generation device 101 through condensation may result in the formation of water droplets. To optimize this process, it is preferable to have a tray or basin in place to collect these purified water droplets initially. This tray serves as an intermediary container where the condensate is first gathered. Once the water in the tray accumulates to a certain level, it may then be pumped into the clean water tank. This approach helps to avoid the frequent and unnecessary activation of the pump, which could lead to undesirable noise.

It may be understood that the specific water production approach may be selected based on a variety of factors, such as the climatic characteristics of different regions. For instance, in humid and warm regions like Southeast Asia, semiconductor cooling mechanism with lower water production capacity could be chosen, which may reduce costs while still meeting the water production needs. However, for areas with low humidity like California in the United States, compressor cooling should be selected to ensure a satisfactory user experience. It should be noted that other factors may be considered to make a proper selection.

According to other embodiments of the present disclosure, either alone or in combination with the above-described embodiments, the telescopic mechanism, e.g., in FIG. 2, comprises: an actuator comprising a first motor and a transmission mechanism mechanically connected to the first motor, the transmission mechanism is configured to translate a rotational movement of the first motor into a linear movement of the actuator; and a push-pull rod mechanically connected to the actuator and driven by the linear movement of the actuator to move vertically between the retracted position and the extended position.

According to other embodiments of the present disclosure, either alone or in combination with the above-described embodiments, the telescopic mechanism, e.g., in FIG. 3, comprises: an electromagnet for generating a magnetic attraction force when energized; a spring element for generating an elastic force when compressed; and a magnetic push-pull rod mechanically connected to the spring element and driven by the magnetic attraction force of the electromagnet or the elastic force of the spring element to move vertically between the retracted position and the extended position.

According to other embodiments of the present disclosure, either alone or in combination with the above-described embodiments, the valve element, e.g., in FIGS. 5A-5D, comprises: a first stationary plate and a second stationary plate, each of the first and second stationary plates has a through-hole aligned with the discharge opening of the wastewater tank; a rotatable plate interposed between the first and second stationary plates, the rotatable plate having a through-hole, wherein an alignment of the through-hole of the rotatable plate with the through-holes of the first and second stationary plates controls the open state of the valve element, and a misalignment of the through-hole of the rotatable plate with the through-holes of the first and second stationary plates controls the closed state of the valve element. In an example, the rotatable plate is made of ceramic, and the first and second stationary plates are made of Polytetrafluoroethylene. Additionally, the valve element, e.g., in FIGS. 5A-5D, further comprises a sealing plate interposed between the external bottom surface of the wastewater tank and the first stationary plate, the sealing plate has a through-hole aligned with the discharge opening of the wastewater tank.

According to other embodiments of the present disclosure, either alone or in combination with the above-described embodiments, the valve element, e.g., in FIG. 6, further comprises: a second actuator comprising a second motor and a second transmission mechanism mechanically connected to the second motor, and configured for driving a rotational movement of the rotatable plate relative to the first and second stationary plates; and a position sensor configured to detect whether the through-hole of the rotatable plate aligns with the through-holes of the first and second stationary plates. In an example, the second motor is controlled based on a result of the detecting.

According to other embodiments of the present disclosure, either alone or in combination with the above-described embodiments, the waste discharge device further comprises a waste crushing mechanism, e.g., in FIG. 7, mounted inside the wastewater tank. The waste crushing mechanism comprises: a third motor configured to provide a rotation torque; and a set of blades configured to be driven by the rotation torque of the third motor to scrape off the solidified waste formed on an internal bottom surface of the wastewater tank, such that the solidified waste generated from the distillation of the wastewater is discharged through the discharge opening of the wastewater tank by gravity feed.

Figure 8:
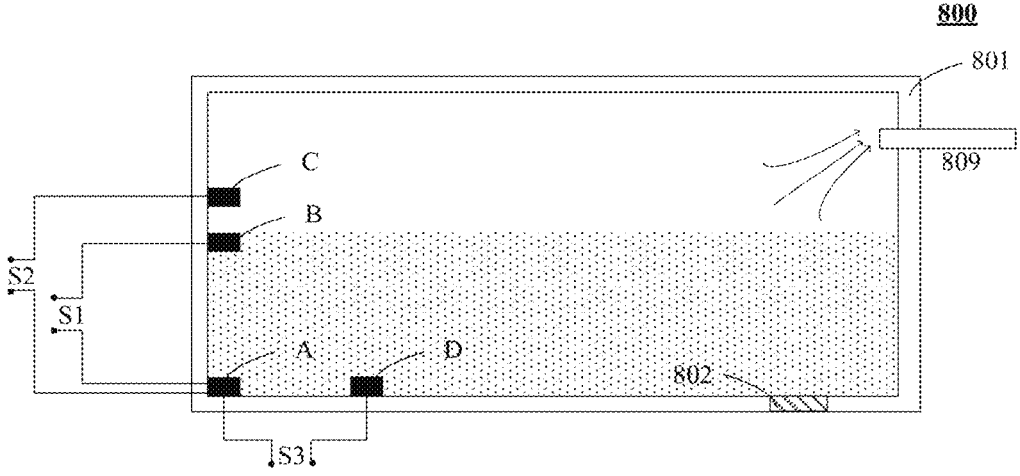
FIG. 8 shows an exemplary schematic diagram of metal contacts in the wastewater tank for water level detection according to an embodiment of the present disclosure.

FIG. 8 shows an exemplary schematic diagram of metal contacts in the wastewater tank for water level detection according to an embodiment of the present disclosure.

As illustrated in FIG. 8, the wastewater tank 801 is equipped with a discharge opening 802 at the bottom and a pipe 809 on the side wall for expelling hot steam generated during the evaporation process, e.g., to the clean water generation device. In this embodiment, the detection of water level is achieved by monitoring the conductivity state of paired metal contacts (which are also referred to as metal electrodes or probes in the present disclosure), which facilitates the process of wastewater treatment in the wastewater tank. As shown, the wastewater tank 801 is furnished with multiple metal contacts, labeled A to D, to perform various functions related to water level detection.

In a first example, metal contacts A and B are utilized to detect the upper limit of the water level, thereby controlling the collection process of wastewater within the tank. As depicted, a first metal contact A is mounted on the internal bottom surface of the wastewater tank 801, and a second metal contact B is mounted on the internal side wall of the wastewater tank 801 at a first height corresponding to a water level upper limit. Accordingly, the collection of the wastewater in the wastewater tank 801 may be controlled based on a first conductive state S1 between the first metal contact A and the second metal contact B.

For instance, when the water level has not reached the first height where the second metal contact B is located, indicating that metal contacts A and B are not conductive (or not short-circuited), it suggests that the wastewater pumped into the wastewater tank has not reached its treatment capacity. Consequently, the docking station may continue to pump wastewater into the wastewater tank. In contrast, when the water level rises to the height of the second metal contact B, the conductivity of the wastewater will cause metal contacts A and B to become conductive (short-circuited), signaling to halt the pumping of wastewater.

This approach of detecting the upper limit of the water level is a significant advancement over traditional methods that rely on magnetic floats and magnetic sensing devices, and offers a more straightforward, efficient, and precise approach to water level monitoring, ensuring optimal operation of the wastewater treatment process.

In a second example, the first metal contact A and a third metal contact C may be used for detecting the boiling of wastewater, thereby controlling the heating process inside the wastewater tank, which may involve adjusting the heating power of the heater or managing the connection and disconnection of the heater's power supply. As depicted, the third metal contact C is mounted on the internal side wall of the wastewater tank 801 at a second height, and the second height is higher than the first height and corresponds to the boiling point water level. Accordingly, the heater (for instance, its heating power or its connection status to the power source) may be controlled based on a second conductive state S2 between the first metal contact A and the third metal contact C. This control mechanism is designed to maintain the wastewater at a predetermined temperature below the boiling point.

For instance, it may be understood that the water surface is calm before boiling, but when boiling occurs, it may become turbulent and potentially rise above the upper limit of the water level. Therefore, when the turbulent boiling of the wastewater causes the water level to reach the second height where the third metal contact C is located, resulting in conduction (or short-circuit) between metal contacts A and C, it indicates that the wastewater has started to boil. At this point, it is necessary to reduce the power of the heater or temporarily disconnect its power supply to keep the water temperature below boiling.

Hence, complementing the temperature control approach as mentioned earlier through a PID algorithm, even if the PID algorithm fails, reliable boiling detection may still be achieved through the detection of the conductive state of the metal contacts. This approach effectively prevents the spattering of solid particles that may occur due to boiling and avoids the generation of unpleasant odors that may result from burning or charring.

In a third example, the first metal contact A and a fourth metal contact D may be used to detect if the wastewater is about to be dried out, thereby controlling the heating process inside the wastewater tank, which may also involve adjusting the heating power of the heater or managing the supply or disconnection of the heater's power source. As shown, the fourth metal contact D is also mounted on the internal bottom surface of the wastewater tank, positioned at approximately the same height as metal contact A. Accordingly, the heater is controlled based on a third conductive state S3 between the first metal contact A and the fourth metal contact D. The objective is to prevent the wastewater from completely drying out. Preferably, the power supply to the heater is immediately disconnected to cease heating.

For instance, it may be understood that while there is still wastewater being evaporated, both metal contacts A and D are submerged within the water, thus they are in a conductive state (short-circuited). However, once the wastewater has fully evaporated, the conductive state between them will cease. Consequently, when metal contacts A and D are no longer in a conductive state, it is imperative to immediately disconnect the power supply to prevent any further heating of the wastewater tank, which could otherwise lead to undesirable odors, product damage, or even potential hazards such as fires. This approach ensures that the wastewater is heated efficiently and safely, avoiding the risks associated with over-heating and promoting a more reliable operation of the cleaning robot's docking station.

It should be noted that the number of metal contacts and their respective positions as illustrated in the above examples are provided as examples, a greater number of metal contacts installed at various locations inside the wastewater tank may be used, as long as these metal contacts are arranged in pairs to facilitate water level detection. Additionally, a variety of methods for detecting the conductivity status between two contacts may be used, for example, by measuring electrical current or resistance, the present disclosure does not impose limitations on the specific techniques used for such detection.

Figure 9:
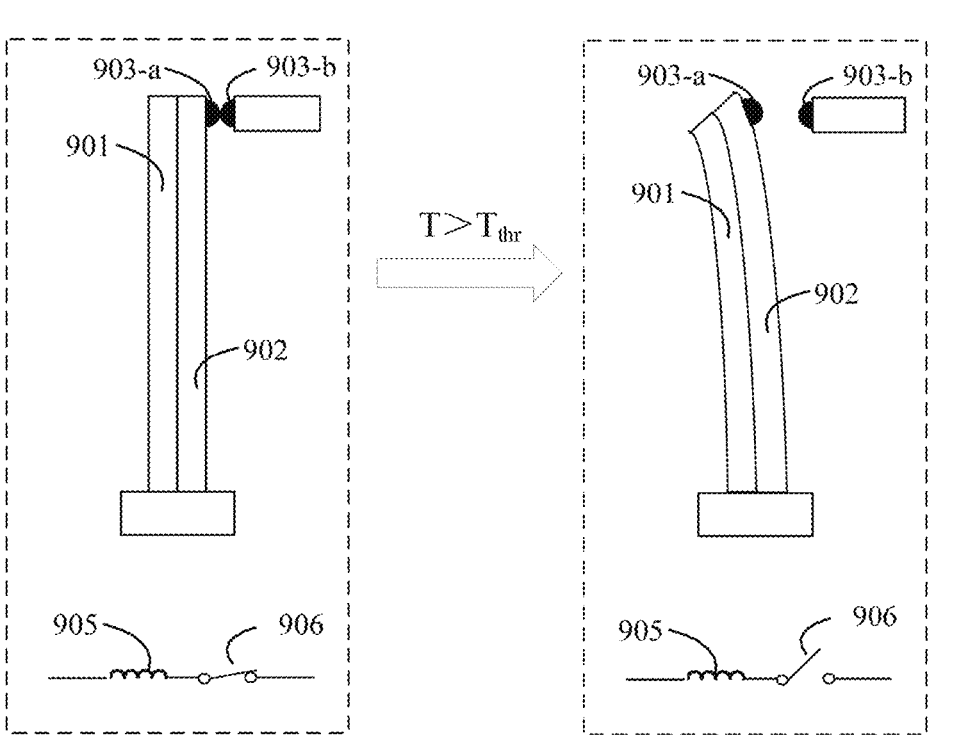
FIG. 9 shows an exemplary schematic diagram of a bimetallic switch for controlling the heating process according to an embodiment of the present disclosure.

FIG. 9 shows an exemplary schematic diagram of a bimetallic switch for controlling the heating process according to an embodiment of the present disclosure.

In this embodiment, a bimetallic switch is mounted on the external side wall of the wastewater tank, and it comprises a first metal plate and a second metal plate, each of the plates has a different temperature coefficient. Accordingly, the heater may be controlled with the aid of the bimetallic switch in response to different thermal deformations of the first metal plate and the second metal plate.

For example, the operation of the bimetallic switch 900 is depicted in the two dashed-line blocks of FIG. 9, illustrating the ON state (the left part of FIG. 9) and the OFF state (the right part of FIG. 9B). The working principle of the bimetallic switch is based on the fabrication of two metal plates with different temperature coefficients, such as the thermal expansion coefficients. As the temperature rises, the differential in deformation between the two metal plates increases. Once a certain temperature threshold is exceeded, the metal plates deflect, causing electrical contact points to separate and thereby interrupting power supply.

As shown in the left-hand dashed-line block of FIG. 9, the bimetallic switch has a first metal plate 901 (the passive layer) and a second metal plate 902 (the active layer). At room temperature and without deformation, the contact points 903-a and 903-b remain in contact. In this state, which corresponds to the closed position of switch 906, the heater 905 (which may be a heating wire encircling the exterior of the wastewater tank) is connected to its power source (not shown), initiating the heating process.

However, as depicted in the right-hand dashed-line block of FIG. 9, when the temperature of the metal plates increases due to the heating by the heater 905 (for example, when the temperature exceeds a threshold $T_{thr}$), the second metal plate 902, being the active layer, expands more than the first metal plate 901 as the passive layer. This causes the metal plates of the bimetallic switch to bend towards the left, resulting in the separation of contact points 903-a and 903-b. In this state, which corresponds to the open position of switch 906, the heater 905 is disconnected from its power source, ceasing the heating process.

In this example, the bimetallic switch provides an additional protective mechanism against drying out, further ensuring the reliable avoidance of unpleasant odors and dangers associated with burning or charring. This feature enhances the safety and reliability of the wastewater treatment process in the docking station of the cleaning robot. It should be noted that various types of metal plates may be used as long as they have different temperature coefficients, the present disclosure does not limit the materials used.

Figure 10:
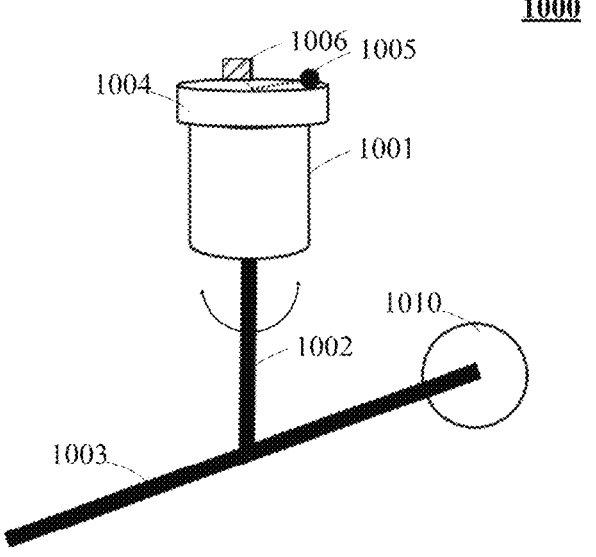
FIG. 10 shows an exemplary schematic diagram of a waste crushing mechanism according to another embodiment of the present disclosure.
Figure 10:
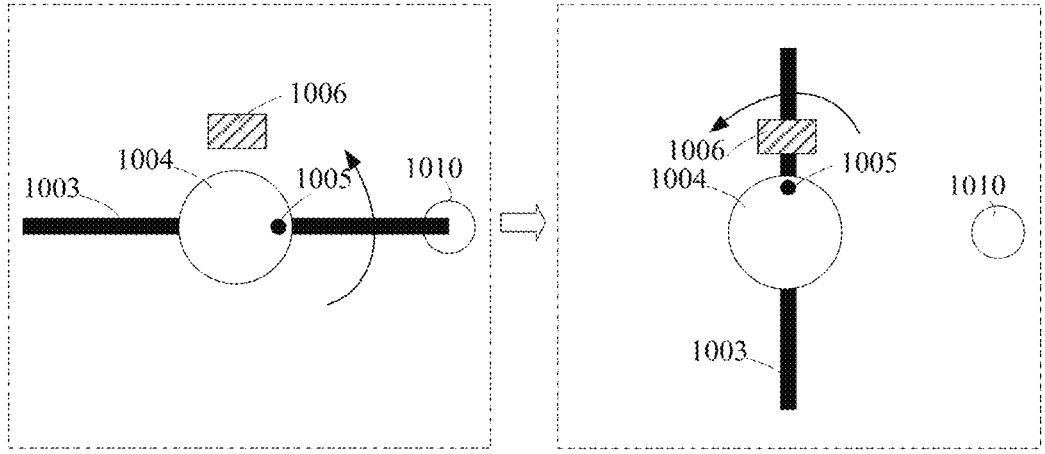

FIG. 10 shows an exemplary schematic diagram of a waste crushing mechanism according to another embodiment of the present disclosure.

The inventors have recognized a potential issue that arises when the length of the rotating blades of the waste crushing mechanism is extended across the entire bottom surface of the wastewater tank to effectively scrape and remove dried waste. For example, if the blades stop rotating directly over the discharge opening of the wastewater tank, it could lead to interference with the telescopic mechanism when the telescopic mechanism moves downward to its extended position to break through solidified waste. This could potentially damage the blades or the telescopic rod during the impact process for the solidified waste.

To address this, a blade positioning mechanism is proposed to prevent the blades from stopping over the discharge opening, ensuring that the telescopic mechanism may move downward without colliding with the blades, which is described hereinafter in FIG. 10. It should be noted that the waste crushing mechanism of FIG. 10 is substantially similar to that mentioned in FIG. 7, the main difference lies in the introduction of a rotating magnet and a magnetic detection device to control the resting position of the blades.

According to embodiments of the present disclosure, the waste crushing mechanism includes a rotating plate mounted on a first end of a rotating shaft of the third motor (e.g., the third motor as described in FIG. 7), wherein a magnet is mounted on an edge of the rotating plate and rotates together with the set of blades mounted on a second end of the rotating shaft opposite to the first end. In addition, the waste crushing mechanism further includes a magnetic sensing element mounted on an internal side wall of the wastewater tank at a height corresponding to the rotating plate and within a threshold distance to the rotating plate. Accordingly, a position of the set of blades is controlled based on a result of detecting the magnet by the magnetic sensing element during rotation of the set of blades.

As depicted in FIG. 10, the waste crushing mechanism 1000 includes a motor 1001, which provides the power needed for waste crushing, and a set of blades 1003 that crush the waste during its rotation for discharge of the dry debris by gravity. The motor 1001 also has a rotating shaft 1002, with one end fitted with a rotating plate 1004 and the other end with the blades 1003. A magnet 1005 is mounted on the edge of the rotating plate 1004 and rotates together with the blades 1003, indicating the position where the blades will rest. Consequently, the location where the magnet stops rotating serves as an indicator of the blades' resting position. For example, the magnet 1005 is located such that a line drawn from the magnet to the pivot point of the motor's rotational axis is parallel to a lengthwise direction of the blades, as shown in FIG. 10.

Additionally, a magnetic sensing element 1006, such as a Hall sensor, is mounted on the internal side wall of the wastewater tank at a height corresponding to the rotating plate, and detects whether the magnet 1005 approaches the magnetic sensing element 1006 during the rotation of the blades 1003. For instance, the magnetic sensing element 1006 is positioned such that a line drawn from the magnetic sensing element to the pivot point of the motor's rotational axis is perpendicular to the line drawn from the discharge opening 1010 to the pivot point of the motor's rotational axis. Accordingly, the magnetic sensing element 1006 triggers (e.g., successfully detects an existence of a magnet nearby) when the magnet 1005 approaches the sensor 1006, which indicates that the rotating blades are away from the discharge opening 1010, preventing interference between the telescopic mechanism and the blades and avoiding damage to critical components.

For example, as shown in the left-hand dashed-line block of FIG. 10, the detection of magnet 1005 being away from the magnetic sensing element 1006 indicates a possibility that the blades are directly above the discharge opening 1010. At this point, the motor 1001, through the rotating shaft 1002, continues to drive the blades 103 to rotate. In contrast, as shown in the right-hand dashed-line block of FIG. 10, when the magnet 1005 is detected to be close to the magnetic sensing element 1006, it indicates that the blades are not positioned above the opening 1010. Consequently, the motor 1001 may halt, ensuring that the blades will not rest directly above the opening 1010.

It should be noted that the specific locations of the magnet and the magnetic sensing element described in the example are illustrative. The actual installation positions may vary as long as they may effectively determine whether the blades are above the discharge opening. The present disclosure does not restrict the specific installation positions.

Figures 11, 12:
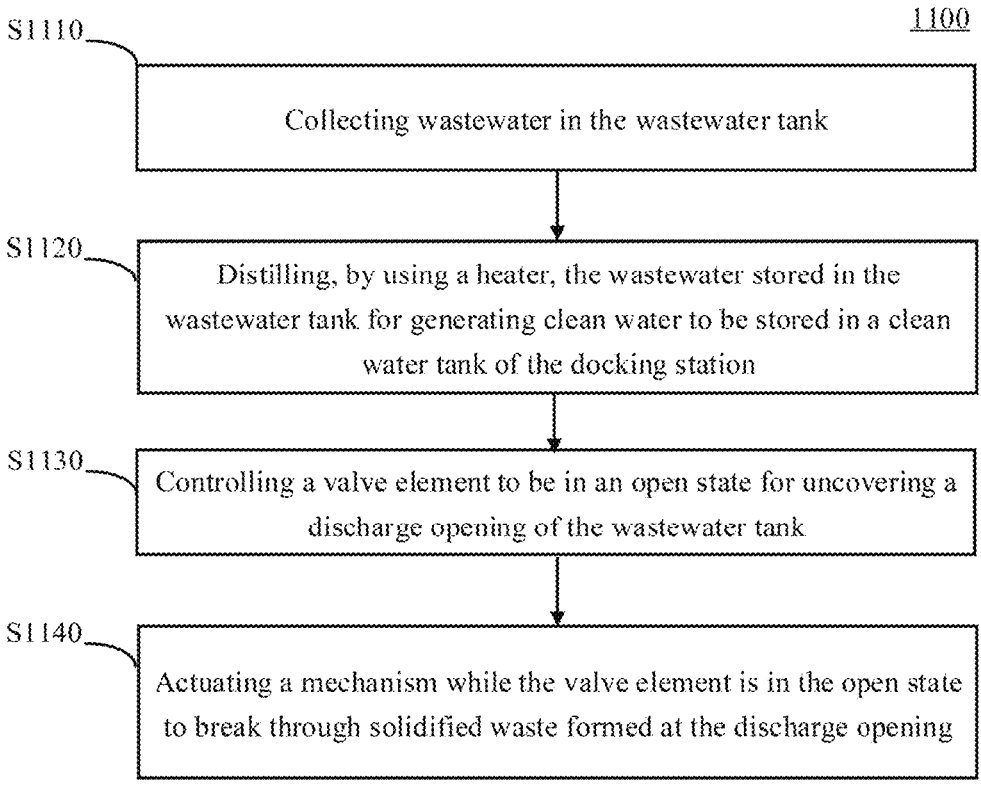
FIG. 11 shows a flowchart of a computer-implemented method of operating a docking station of a cleaning robot according to an embodiment of the present disclosure.
FIG. 12 is an exemplary block diagram illustrating a computing device according to embodiments of the disclosure.

FIG. 11 shows a flowchart of a computer-implemented method of operating a docking station of a cleaning robot according to an embodiment of the present disclosure.

The method may be implemented in the docking station as depicted in FIG. 1 and the detailed description of method 1100 may refer to the content described in the above with respect to FIGS. 1-10. For example, method 1100 may be executed in the structure described with respect to FIGS. 1-10 and according to the control operations on the components of the docking station of the cleaning robot involved in the processes of wastewater distillation, solidified waste discharge and clean water generation among other processes as described with respect to FIGS. 1-10. In addition, each step of method 1100 may be performed by one or more processing units, such as central processing unit (CPU) of the docking station.

With reference to FIG. 11, method 1100 comprises steps S1110-S1140.

At step S1110, method 1100 comprises collecting wastewater in the wastewater tank. Specifically, the wastewater was generated from washing one or more mopping pads of the cleaning robot. According to an example, the wastewater may be collected through various suitable methods. For instance, a vacuum pump or a sump pump may be utilized to extract the wastewater generated from cleaning the mopping pads into the wastewater tank. It is understood that alternative appropriate methods may be employed for collecting wastewater into the wastewater tank for subsequent distillation and purification treatment.

Additionally, a wastewater transfer tank may be installed alongside the wastewater tank to temporarily hold the wastewater before it is further transferred to the wastewater tank, also referred to as an evaporation dish, for heating and evaporation. It should be noted that the wastewater transfer tank may be selectively used for wastewater collection. By eliminating the wastewater transfer tank, the need for certain peripheral auxiliary devices may be avoided, which helps to reduce the overall size and cost of the docking station. Conversely, incorporating the additional transfer tank may facilitate the process by reducing the difficulty of creating a negative pressure in the wastewater tank or the evaporation dish.

At step S1120, method 1100 comprises distilling, by using a heater, the wastewater stored in the wastewater tank for generating clean water to be stored in a clean water tank of the docking station. In this step, a temperature of the wastewater heated in the wastewater tank may be detected and a heating power of the heater is controlled to maintain the temperature of the heated wastewater at a predetermined temperature below a boiling point. As a result, the solidified waste will be generated at the bottom of the wastewater tank.

Concurrently with step S1130, a clean water generation device of the docking station may be controlled to generate the clean water from water vapor using one or both of a condensation mechanism and a moisture absorption mechanism. In an example, as described above, the condensation mechanism comprises one or more of a compressor cooling mechanism, a semiconductor cooling mechanism, an air-cooling mechanism, and a liquid cooling mechanism. In another example, as described above, the moisture absorption mechanism comprises hygroscopic materials for absorbing the water vapor and a heater for heating the hygroscopic materials for generating liquid water.

Optionally, during the evaporation of wastewater, the wastewater heated in the wastewater tank may be agitated, for example, using the afore-mentioned rotating blades, to prevent caking and charring, which may produce unpleasant odors.

At step S1130, method 1100 comprises controlling a valve element to be in an open state for uncovering the discharge opening. For example, the valve element, such as those described in FIGS. 2-5D, is mounted at a position corresponding to the discharge opening. Details for the control of the valve element may refer to the descriptions of FIGS. 2-5D, and omitted here.

At step S1140, method 1100 comprises actuating a mechanism while the valve element is in the open state to break through solidified waste formed at the discharge opening. For example, the mechanism may be implemented a telescopic mechanism, and the telescopic mechanism may be actuated by moving the telescopic mechanism from a retracted position to an extended position relative to the discharge opening to break through the solidified waste formed at the discharge opening. For example, the telescopic mechanism, such as those described in FIGS. 2-5D, is disposed at various positions relative to the discharge opening inside or outside the wastewater tank. Details for the control of the telescopic mechanism may refer to the descriptions of FIGS. 2-5D.

According to the joint control of the valve element and telescopic mechanism in steps S1130 and S1140, the discharge opening may be prevented from being blocked by the solidified waste generated from the distillation of wastewater.

In addition, method 1100 comprises scraping off the solidified waste formed on an internal bottom surface of the wastewater tank, such that the solidified waste generated from the distillation of the wastewater is discharged through the discharge opening of the wastewater tank by gravity feed. For example, the solidified waste may be scraped off by using the waste crushing mechanism, such as those described in FIGS. 2-7, into smaller pieces, fine particles or powder and may be easily discharged through the cleared discharge opening.

An exemplary operational procedure for the valve element, telescopic mechanism, and rotating blades is as follows. The valve element at the bottom of the wastewater tank or evaporation dish is switched to its open state, allowing the telescopic mechanism to extend to its extended position to break through the solidified waste accumulated at through-hole of the valve element. The telescopic mechanism then retracts to its retracted position, and the rotating blades (optionally accompanied by dust brushes that rotate with the blades) crushes and sweeps the dry debris towards the cleared discharging opening. The dry debris then falls into the dust collection box through the cleared discharging opening by gravity. This process is repeated several times, for example, 10 times. Subsequently, the valve element is closed, returning to the initial state, and waits for the collection of the next round of wastewater to begin the next cycle of water purification treatment. Thereafter, when the dust collection box is filled with dried debris, the user simply empties it.

In this way, users are spared the trouble of removing the wastewater tank and pouring out the wastewater, as well as manually cleaning and unclogging the discharging opening, reducing the burden of operation and enhancing the user experience. It is understood that the above procedure serves as an example and different control methods may be applied to the docking station to achieve efficient wastewater treatment and solid waste cleanup. The present disclosure is not limited to the specific mode of operation described.

At least based on the above embodiments of the present disclosure, an improved mechanism for handling the wastewater generated from cleaning the mopping pads and for handling the solidified waste generated from the distillation of the wastewater at the docking station to enhance the user experience while recycling water resources. Additionally, the discharge opening of the wastewater tank may be efficiently prevented from being blocked by the solidified waste generated from the distillation of wastewater based on the linked control and coordination of the telescopic mechanism and the valve element of the waste discharge device, without the need to manually check and clear the discharge opening.

FIG. 12 is an exemplary block diagram illustrating a computing device according to embodiments of the disclosure.

It should be noted that the computing device depicted in FIG. 12 may be used in the docking station to control the operation of the components of the docking station to operate the docking station, for example, to perform method 1100 as described above.

As shown in FIG. 12, the computing device 1200 may comprise processor 1210 and memory 1220. The processor 1210 is communicatively coupled with the memory and configured to perform the methods discussed above.

Examples of the processor 1210 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout The present disclosure.

The processor 1210 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 1220.

The memory 1220 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 1220 may reside in the processor 1210, external to the processor 1210, or distributed across multiple entities including the processor 1210. The memory 1220 may be embodied in a computer program product. By way of example, a computer program product may include a computer-readable medium in packaging materials. Those skilled in the art will recognize how to implement the described functionality presented throughout the present disclosure depending on the particular application and the overall design constraints imposed on the overall system.

In addition, according to another embodiment of the present disclosure, a computer program product for forwarding data packets for a client device is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

Traditional solutions for docking stations of autonomous cleaning robots, aiming to facilitate user convenience by eliminating the need for clean water replacement and wastewater discharge, have often relied on the installation of complex plumbing systems. These systems automate the process of replenishing clean water and discharging wastewater. However, a significant limitation is the requirement for suitable installation sites with appropriate piping and space, which many households lack, thus preventing the installation of such systems. To overcome these challenges, the present disclosure proposes an improved solution for docking stations of autonomous cleaning robots that automatically handles wastewater and generates clean water, enabling an effective water recycle.

Figure 13:
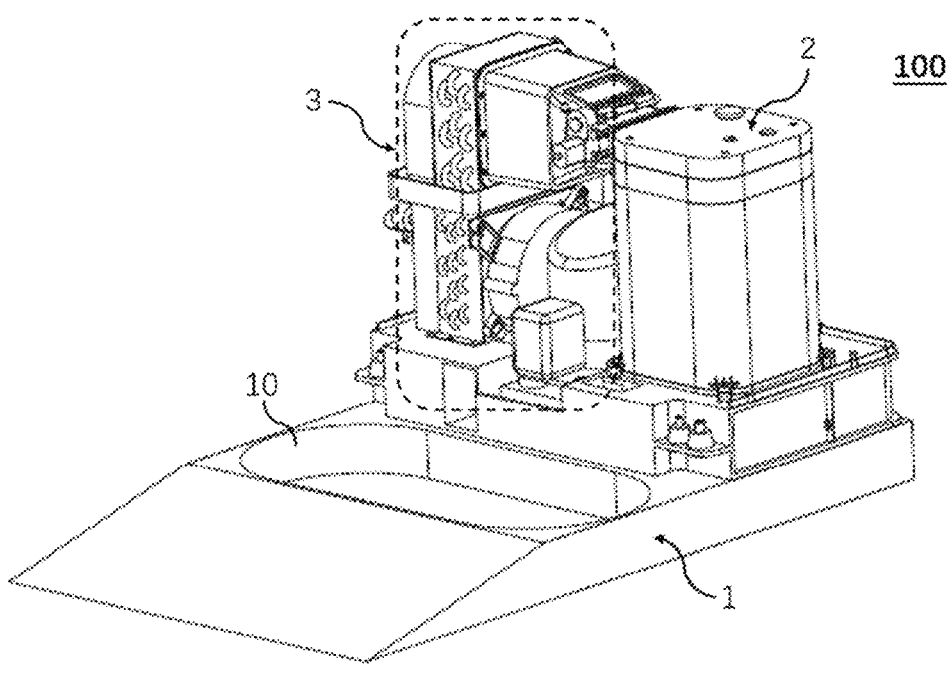
FIG. 13 shows an exemplary schematic diagram of a docking station of a cleaning robot according to an embodiment of the present disclosure.

FIG. 13 shows an exemplary schematic diagram of a docking station of a cleaning robot according to an embodiment of the present disclosure.

As depicted in FIG. 1, the docking station 100, according to an embodiment of the present disclosure, is designed with the capability to autonomously process wastewater and produce clean water, which eliminates the need for manual operations of clean water replacement and wastewater discharge. As shown in FIG. 1, the docking station 100 comprises a wash device 1, a wastewater treatment device 2 and a clean water generation device 3.

The wash device 1 comprises a wash sink 10 constructed to clean the mopping pads of the cleaning robot and to generate wastewater in the process.

The wastewater treatment device 2 collects the wastewater generated from washing the mopping pads of the cleaning robot and heats the wastewater to generate steam. The clean water generation device 3 is capable of generating clean water from the steam.

After the clean robot finishes a current cleaning cycle and docks at the docking station 100, the mopping pads of the clean robot is arranged in the wash sink 10 of the wash device 1 and is cleaned. To this end, clean water is supplied to the wash sink 10 by a clean water tank which not shown in figure. The wastewater generated during the cleaning of the mopping pads may be pumped, for example, via a sump pump to the wastewater treatment device 2 and distilled at the wastewater treatment device 2 for generating clean water, which may be later stored in a clean water tank of the docking station 100 (which is configured to hold a supply of clean water) and/or supplied to the cleaning robot for a next cleaning cycle.

Accordingly, the wastewater treatment device 2 incorporates an evaporation/distillation mechanism that facilitates the removal of water content, leading to the concentration of solid waste, which remains at the bottom of the wastewater treatment device 2 The solid waste is processed, for example, by a rotating blade for scraping or a pulverizing mechanism for breaking it into smaller pieces, which may be discharged as dry debris through a discharge opening provided at the bottom of the wastewater treatment device 2 and collected in a dust collection box positioned beneath the wastewater treatment device 2. Consequently, users only need to periodically empty the dust collection box of dry debris, eliminating the need to remove the wastewater treatment device 2 and dispose the wastewater.

Additionally, the clean water generation device 3 is capable of generating clean water from the steam. Depending on the different working states, the steam for generate water from the different sources. Consequently, the clean water generation device 3 may work in a wastewater-water generation mode and an air-water generation mode. In the air-water generation mode, the clean water generation device 3 receives water vapor originated from the moisture in the air. In the wastewater-water generation mode, the clean water generation device 3 receives the steam produced by the distillation of the wastewater in the wastewater treatment device 2. The steam/moist air may be used as sources of water vapor for generating clean water. This process results in the creation of clean water, which is then stored in the clean water tank or supplied to the cleaning robot, as mentioned above. In this manner, the wastewater generated from the process of washing the mopping pads and ambient humidity are effectively utilized, allowing users to forgo the disposal of wastewater and manual addition of clean water, thus achieving an efficient recycling of water resources and reducing the operational burden on the user.

Figure 14:
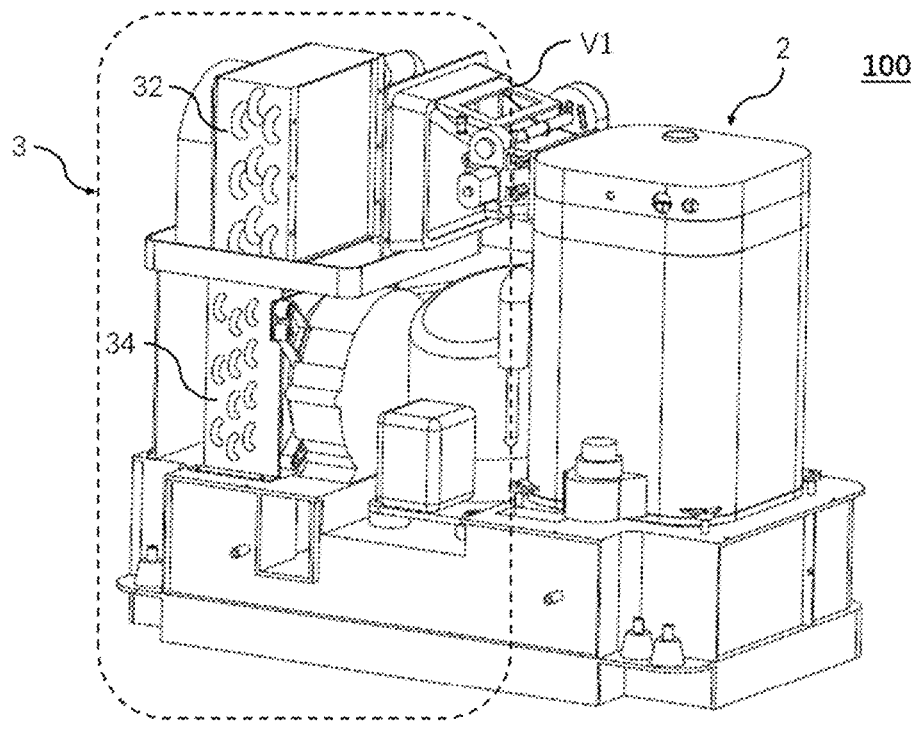
FIG. 14 shows an exemplary schematic diagram of a wastewater treatment device and a clean water generation device of the docking station according to an embodiment of the present disclosure.

FIG. 14 only illustrates the main components of the docking station 100, such as the wastewater treatment device 2 and the clean water generation device 3 in a schematic way, however, the docking station 100 may also incorporate other structures or components not depicted in FIG. 2. In addition, the structures and connections shown in FIG. 14 are exemplary and alternative configurations may also be used. The present disclosure does not limit the details of the structures and their interconnections for the docking station 100.

In the context of the present disclosure, which employs the distillation approach to purify wastewater for water recycling at the docking station, the inventors have recognized the following problem. Although the distillation process may produce hot steam that is subsequently condensed to create purified liquid water, there is a challenge associated with the generation of unpleasant odors during the evaporation of the wastewater. For example, when the wastewater dries up, the solid waste remains at the bottom of the wastewater treatment device 2 and should be removed thereafter. However, as the liquid phase evaporates, odorants contained in the wastewater may also evaporate and escape from an air ducts into the environment of the docking station 100.

In view of at least the above problem, the overall concept of the present disclosure is to close a gas passage between the wastewater treatment device and the external environment during the wastewater evaporation/distillation process in order to prevent odorous substances from escaping from the docking station into the environment.

FIG. 14 shows an exemplary schematic diagram of the wastewater treatment device 2 and the clean water generation device 3 of the docking station 100 according to an embodiment of the present disclosure, wherein for the sake of simplicity the wash device 1 is omitted.

Figure 15:
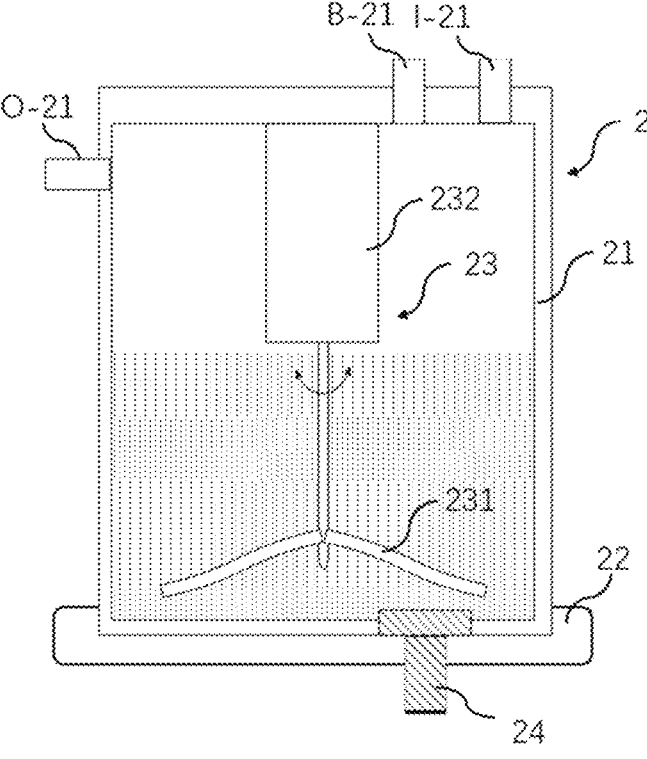
FIG. 15 shows an exemplary schematic diagram of a wastewater treatment device according to an embodiment of the present disclosure.

With reference to FIG. 15, the wastewater treatment device 2 comprises a wastewater tank 21 and a heater 22, wherein the wastewater generated during the wash of mop is accommodated in the wastewater tank 21, and the heater 22 is arranged under the wastewater tank 21, thereby by means of the heater 22 heating the wastewater tank 21 to promote evaporation of the wastewater. The wastewater tank 21 comprises a gas exhaust port O-21, a gas inlet port I-21 and a pressure balancing member B-21 constructed as a top opening, wherein a gas mixture including water vapor and odorous substances generated by evaporation of the wastewater is discharged through the gas exhaust port O-21. The wastewater tank 21 further comprises a drain port arranged at the bottom thereof and a drain valve 24 configured at the drain port, by means of which dry debris remaining at the bottom of the wastewater tank 21 after the wastewater has been evaporated to dryness may be discharged, and by means of a switch of the drain valve 24 the drain port may be opened and closed. When there is no need to discharge the dry debris through the drain port, the drain valve is in the closed state to seal the liquid, whereas it switches to the open state to allow the drain port open to discharge the dry debris.

The wastewater treatment device 2 further comprises a heater 22 provided to the wastewater tank 21, wherein the heater 22 is mounted on an external side wall of the wastewater tank 21 and configured to heat the collected wastewater for generating the clean water to be stored in the clean water tank. For instance, the heater 22 could take the form of a heating strip or any other suitable heating device. Furthermore, the docking station 100 may include a fan mechanism installed inside the wastewater tank, which enhances air circulation and accelerates the evaporation process of the wastewater, thereby improving the efficiency of clean water production.

In the embodiment, the docking station 100 further comprises a temperature sensor provided to the wastewater tank 21, which is configured to detect a temperature of the wastewater heated in the wastewater tank. In this case, the heater is controlled based on the detected temperature to maintain the temperature of the heated wastewater at a predetermined temperature below a boiling point, for example, using a Proportion Integration Differentiation (PID) algorithm. For example, the heater may be controlled in various ways, such as by controlling the heating power of the heater, or by controlling the connection or disconnection with its power supply, thereby enabling precise temperature control of the wastewater. This ensures that the wastewater undergoes evaporation at a temperature that prevents boiling, thereby effectively avoiding the spattering of solid particles that may result from boiling (which may otherwise pass through the pipe of the wastewater tank for expelling hot steam and cause contamination to the purified water) and avoiding the generation of unpleasant odors that may result from burning or charring.

In addition, the wastewater treatment device 2 comprises a waste crushing mechanism 23 provided to the wastewater tank 21 comprising a set of rotating blades 231 and an electric actuator 232 for driving the rotating blades 231. Agitation the wastewater accommodated in the wastewater tank 21 by rotation of the rotating blades 231 facilitates, on the one hand, evaporation of the wastewater and, on the other hand, stirring up the solid dirt contained in the wastewater to be easily discharged through the drain port which is in an open state.

According to an embodiment of the present disclosure, the docking station 100 further comprises clean water generation device 3, which is constructed to generate clean water from steam in an air-water generation mode and a wastewater-water generation mode. In the air-water generation mode, steam containing water vapor from the external environment is transported to the clean water device 3; in the wastewater-water generation mode, steam containing water vapor and odor substances generated in the wastewater treatment device 2 is output to the clean water generation device 3 through the gas exhaust port O-21 of the wastewater tank 21. With regard to a flow of the steam, the clean water generation device 3 comprises a steam condensing mechanism 32 and a gas heating mechanism 34 connected downstream of the steam condensing mechanism 32. In the wastewater-water generation mode, the steam from the wastewater treatment device 2 is condensed and dewatered in the clean water generation device 3, the dewatered steam is fed back to the wastewater tank 21 without being transported to the gas heating mechanism 34; and in the air-water generation mode, steam from the external environment is condensed and dewatered in the steam condensing mechanism 32, and the dewatered steam is transported to the gas heating mechanism 34 to be reheated and to continue to be conducted as needed.

Figure 16:
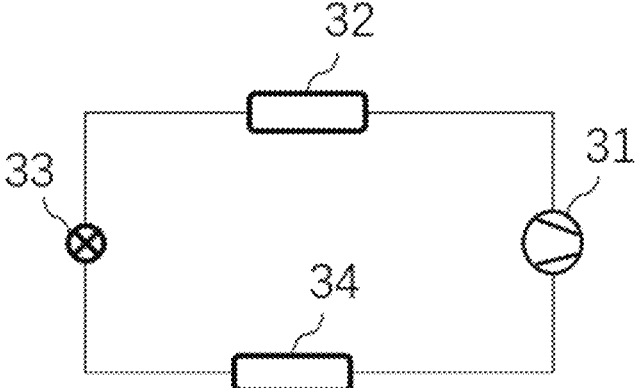
FIG. 16 shows an exemplary schematic diagram of a clean water generation device of the docking station according to an embodiment of the present disclosure.

To enable condensation and reheating of the steam, in this example embodiment, the clear water generation device 3 comprises a refrigerant cycle. As shown in FIG. 16, the refrigerant cycle comprises a compressor 31, an evaporator, an expansion valve 33 and a condenser for the refrigerant. The refrigerant is compressed into a high temperature, high pressure liquid at the compressor 31 and subsequently evaporates and absorbs heat at the evaporator, resulting in a reduction in the temperature of the evaporator. The evaporator is used as a steam condensing mechanism 32 for steam, thereby condensing and dewatering the water-containing steam. The refrigerant is transferred to the condenser through the expansion valve 33 and condenses exothermically, thereby causing an increase in the temperature of the condenser. The condenser is used as the gas heating mechanism 34 for the steam so that the dewatered gas is reheated.

With regard to a flow of the steam, the docking station 100 comprises at least a first pipeline L1 and a second pipeline L2, wherein a gas exhaust port O-21 of the wastewater tank 21 of the wastewater treatment device 2 and a gas inlet port I-32 of the steam condensing mechanism 32 are connected in series in the first pipeline L1, so as to transport steam containing water from the wastewater treatment device 2 to the steam condensing mechanism 32 and condensing therein to generate water; a gas exhaust port O-32 of the steam condensing mechanism 32 and a gas inlet port I-21 of the wastewater treatment device 2 are connected in series in the second pipeline L2, so as to feed back a condensed and dewatered steam at the steam condensing mechanism 32 to the wastewater treatment device 2 through the second pipeline L2, wherein the first pipeline L1 and the second pipeline L2 are capable of being selectively communicated and shut off.

With regard to the flow of the steam, the docking station 100 further comprises a third pipeline L3, in which the steam condensing mechanism 32 and a gas heating mechanism 34 connected downstream of the steam condensing mechanism 32 are connected in series, by means of the gas heating mechanism 34 a condensed and dewatered steam is heated, wherein the third pipeline L3 is capable of being selectively communicated and shut off.

With regard to the flow of the steam, the docking station 100 further comprises a fourth pipeline LA connecting an external environment to the gas inlet port I-32 of the steam condensing mechanism 32, wherein the fourth pipeline L4 is capable of being selectively communicated and shut off.

Figure 17:
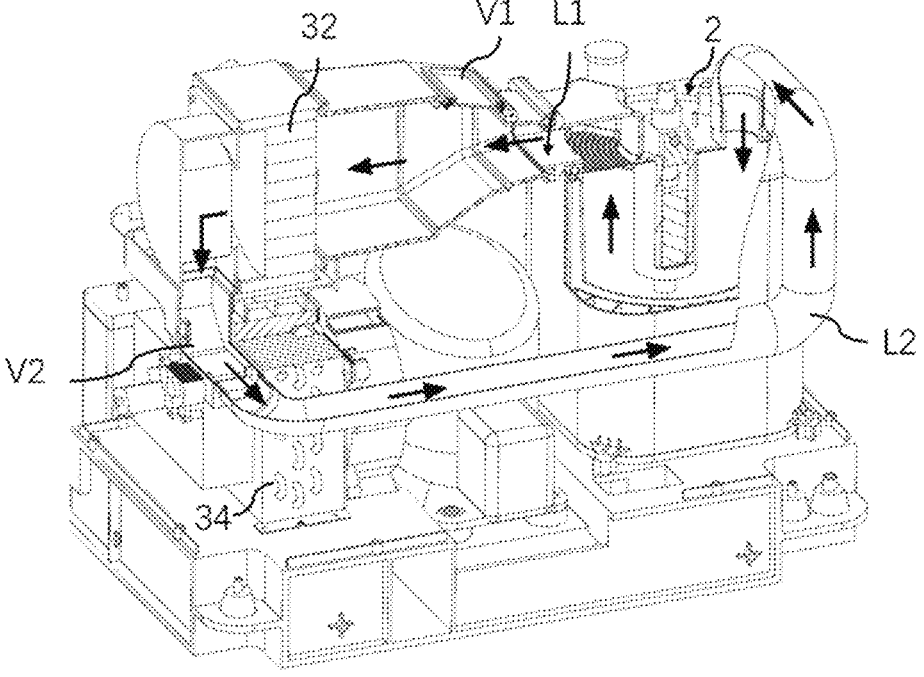
FIG. 17 shows an exemplary schematic diagram of a first valve device in a first state used in the docking station according to an embodiment of the present disclosure.

In the wastewater-water generation mode as shown in FIG. 17, the first pipeline L1 is communicated, the second pipeline L2 is communicated, the third pipeline L3 is shut off, and the fourth pipeline LA is shut off. In this case, the steam condensing mechanism 32 uses the steam mixture from the wastewater tank 21 as a source of steam and generates clean water by condensing the steam. The dewatered steam still contains odorous substances, which is fed back into the wastewater tank 21 via the second pipeline L2 without escaping to the external environment.

Figure 18:
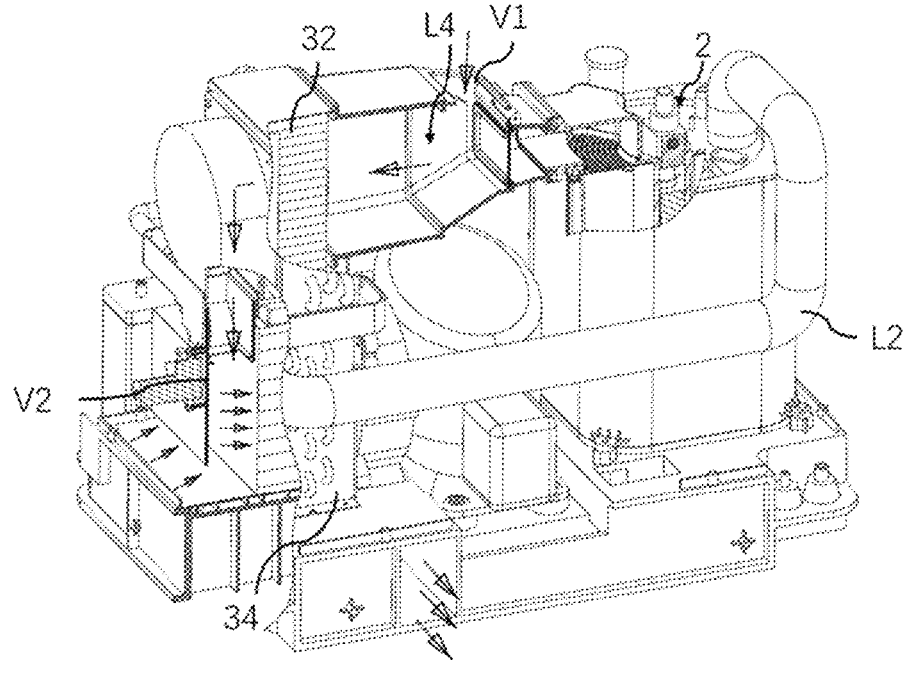
FIG. 18 shows an exemplary schematic diagram of the first valve device in a second state used in the docking station according to an embodiment of the present disclosure.

In the air-water generation mode as shown in FIG. 18, the first pipeline L1 is shut off, the second pipeline L2 is shut off, the third pipeline L3 is communicated, and the fourth pipeline L4 is communicated. In this case, the steam condensing mechanism 32 uses the water-containing steam from the external environment as a source of steam and generates clean water by condensing the steam. The dewatered steam may continue to be transported through the third pipeline L3 without feedback into the wastewater tank 21.

When the first pipeline L1 is connected, the third pipeline L3 is necessarily shut off, thereby avoiding the outward escape of odorous substances from the wastewater and thereby eliminating odors.

To realize switching between the wastewater-water generation mode and the air-water generation mode, the docking station 100 comprises a first valve device V1 arranged between the wastewater tank 21 of the wastewater treatment device 2 and the steam condensing mechanism 32 of the clean water generation device 3 and a second valve device V2 arranged between the steam condensing mechanism 32 and the gas heating mechanism 34 of the clean water generation device 3.

With regard to the flow of the steam, the first valve device V1 is capable of connecting to the gas exhaust port O-21 of the wastewater tank 21 of the wastewater treatment device 2, the gas inlet port I-32 of the steam condensing mechanism 32 and the external environment. The second valve device V2 is capable of connecting to the gas exhaust port O-32 of the steam condensing mechanism 32, the gas inlet port I-21 of the wastewater treatment 21 and a gas inlet port I-34 of the gas heating mechanism 34.

By adjusting the first valve device V1 and the second valve device V2, the connectivity and closure of the first pipeline L1, the second pipeline L2, the third pipeline L3 and the fourth pipeline LA may be controlled.

According to an embodiment of the present disclosure, both the first valve device V1 and the second valve device V2 are constructed as three-way valves. Of course, a combination of two two-way valves may be used instead of a three-way valve.

Figure 19A:
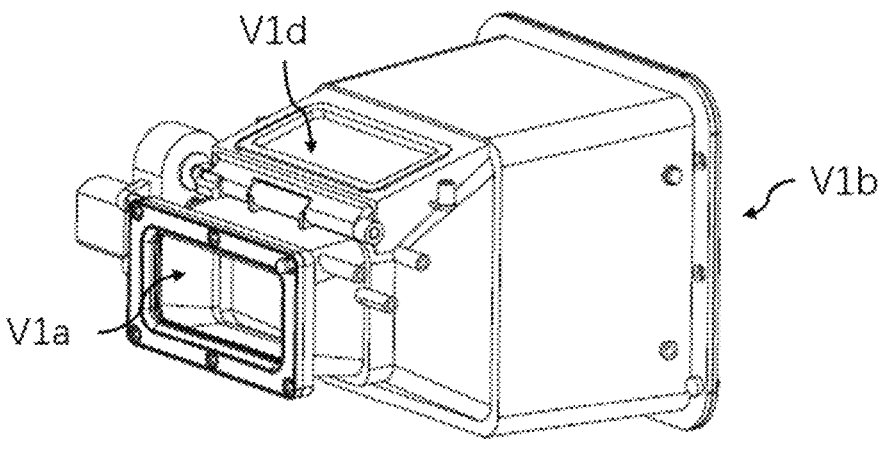
FIGS. 19A to 19C show exemplary schematic diagrams of the first valve device according to an embodiment of the present disclosure.
Figure 19B:
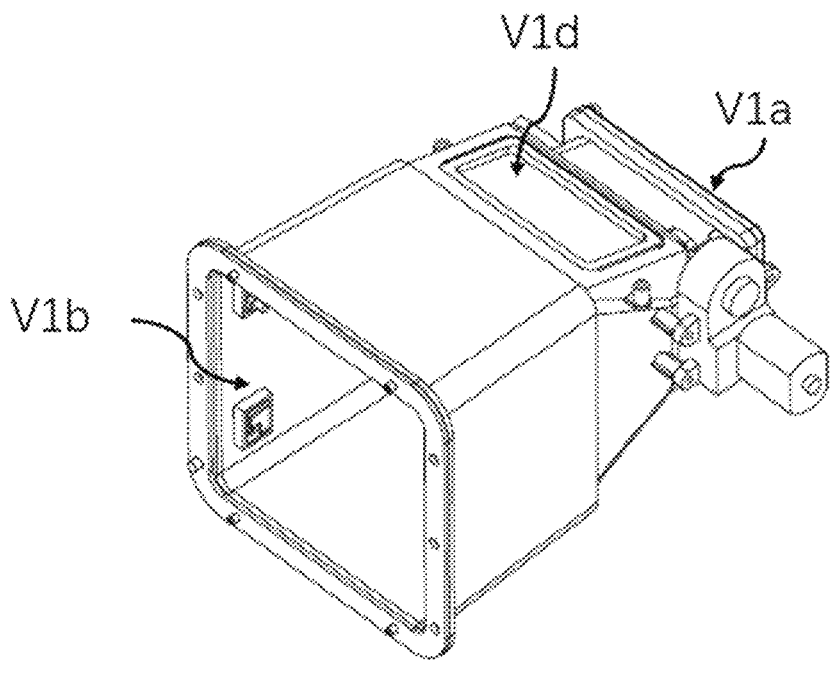
Figure 19C:
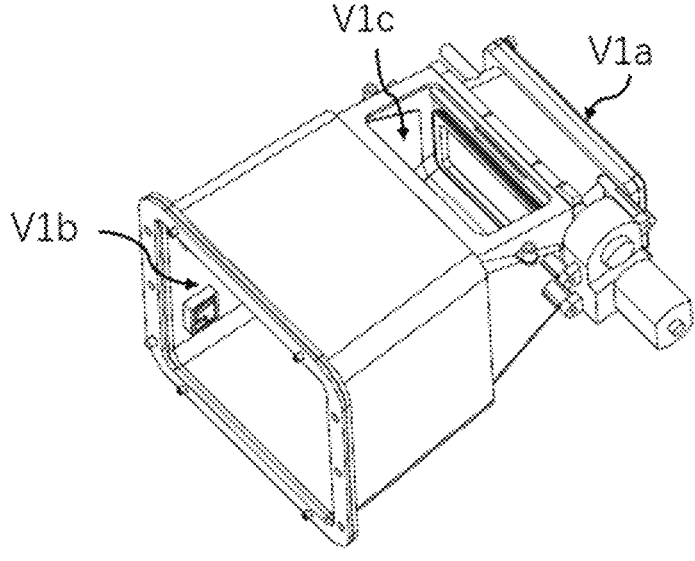

In the embodiment shown in FIGS. 19A to 19C, the first valve device V1 is constructed as a baffle mechanism comprising a first opening V1a connected to an exhaust port O-21 of the wastewater tank 21 of the wastewater treatment device 2, a second opening V1b connected to a gas inlet port I-32 of the steam condensing mechanism 32, a third opening V1c connected to an external environment, and a baffle plate V1d pivotally supported at the third opening V1c, wherein the baffle plate V1d is capable of switching between a first state in which the third opening V1c is covered and second state in which the first opening V1a is covered. When the baffle plate V1d is in the first state shown in FIG. 17, the first pipeline L1 is communicated and the fourth pipeline L4 is shut off. When the baffle plate V1d is in the second state shown in FIG. 18, the first pipeline L1 is shut off and the fourth pipeline L4 is communicated. For sealing reasons, the first opening V1a connected to the gas exhaust port O-21 of the wastewater tank 21 has a smaller cross-section than the second opening V1b connected to the gas inlet port I-32 of the steam condensing mechanism 32. In order to fit with the wastewater tank 21 and the steam condensing mechanism 32, both the first opening V1a and the second opening V1b have a rectangular cross-section.

Accordingly, the second valve device V2 may also have a structure similar to the first valve device V1 so as to shut off the third pipeline L3 when the second pipeline L2 is communicated and to communicate the third pipeline L3 when the second pipeline L2 is shut off.

Figure 20:
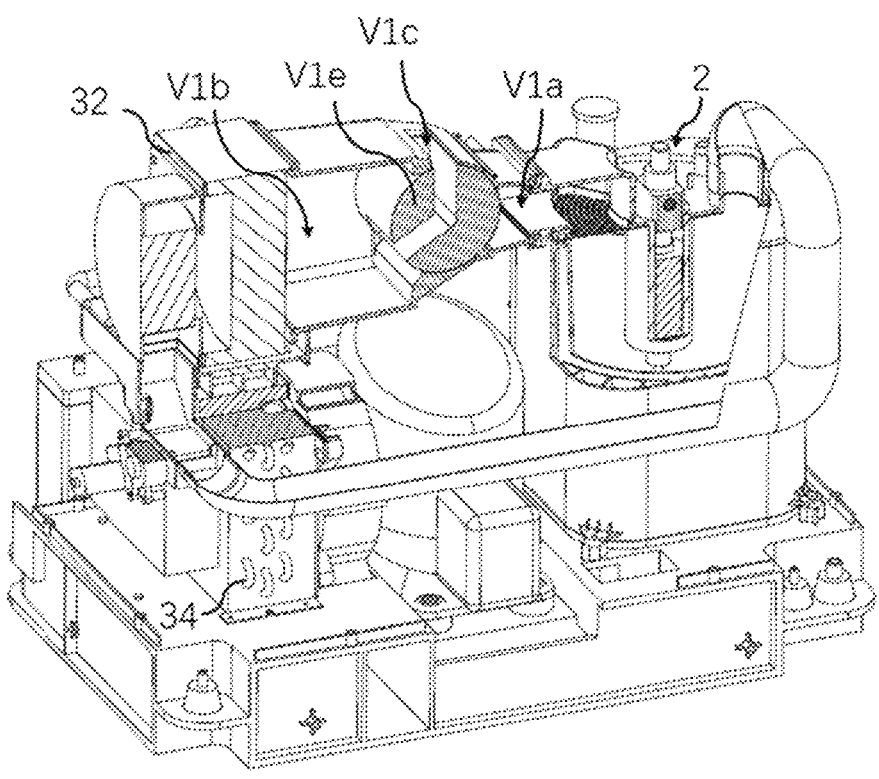
FIG. 20 shows an exemplary schematic diagram of the docking station comprising a first valve according to another embodiment of the present disclosure.

In another embodiment shown in FIG. 20, the first valve device V1 is constructed as a baffle mechanism comprising a first opening V1a connected to an exhaust port O-21 of the wastewater tank 21 of the wastewater treatment device 2, a second opening V1b connected to a gas inlet port I-32 of the steam condensing mechanism 32, a third opening V1c connected to an external environment, and a valve core V1e rotatably supported at the third opening V1c, wherein the valve core V1e is capable of switching between a first state in which the third opening V1c is covered and second state in which the first opening V1a is covered. When the valve core V1e is in the first state, the first pipeline L1 is communicated and the fourth pipeline L4 is shut off. When the valve core V1e is in the second state shown in FIG. 20, the first pipeline L1 is shut off and the fourth pipeline L4 is communicated. For sealing reasons, the first opening V1a connected to the gas exhaust port O-21 of the wastewater tank 21 has a smaller cross-section than the second opening V1b connected to the gas inlet port I-32 of the steam condensing mechanism 32. In order to fit with the wastewater tank 21 and the steam condensing mechanism 32, both the first opening V1a and the second opening V1b have a rectangular cross-section.

According to another embodiment of the present disclosure, with regard to the flow of the steam, the docking station 100 further comprises a fifth pipeline L5, by means of the gas exhaust port O-34 of the gas heating mechanism 34 is connected to the external environment.

Alternatively, with regard to the flow of the steam, the docking station 100 further comprises a fifth pipeline L5, to which the gas exhaust port O-34 of the gas heating mechanism 34 is connected, by means of the fifth pipeline L5 a gas heated by the gas heating mechanism 34 is transported to the wastewater tank 21 to heat the wastewater collected in the wastewater tank 21.

Alternatively, with regard to the flow of the steam, the docking station 100 further comprises a fifth pipeline L5, to which the gas exhaust port O-34 of the gas heating mechanism 34 is connected, by means of the fifth pipeline L5 a gas heated by the gas heating mechanism 34 is transported to the wash sink 10.

One end of the above-described fifth pipeline L5 is connected to the gas exhaust port O-34 of the gas heating mechanism 34, and the other end is selectively connected to a different location as needed to utilize the waste heat contained in the gas from the gas heating mechanism.

The present disclosure relates to a method of operating a docking station 100, comprising:

generating of wastewater during a washing of mopping pads of robots in the wash device 1;
  collecting the wastewater and generating steam from the wastewater in the wastewater treatment device 2;
  transporting the water-containing steam from the wastewater treatment device 2 to the clean water generation device 3, wherein the steam is condensed into water in the clean water generation device 3 and condensed and dewatered gas is fed back to the wastewater treatment device 2. As a result, the escape of odorous substances from the docking station 100 is avoided.

According to another embodiment of the present disclosure, a water-containing steam from an external environment is transported to the clean water generation device 3, wherein the steam is condensed into water in the clean water generation device 3.

FIGS. 21A to 21F show exemplary schematic diagrams of the docking station in various modes of operation according to the present disclosure.

Figure 21A:
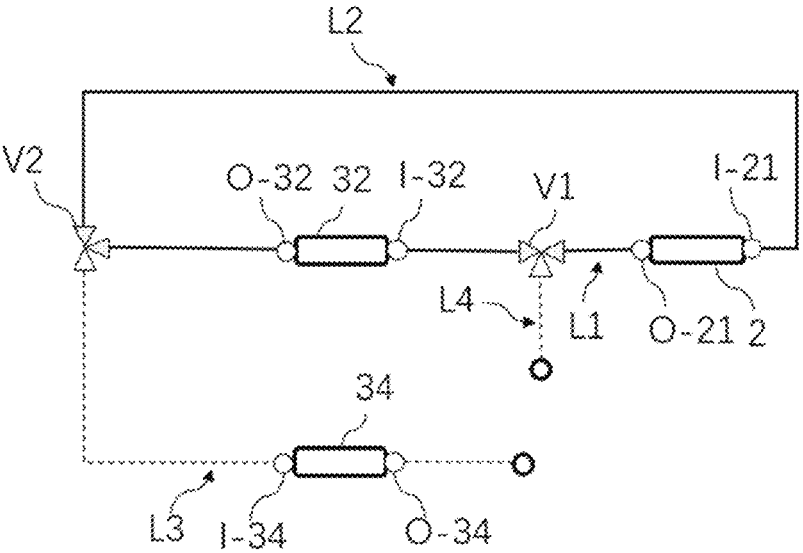
FIGS. 21A to 21F show exemplary schematic diagrams of the docking station in various modes of operation according to the present disclosure.

FIG. 21A illustrates a basic wastewater-water generation mode for the docking station 100.

In this mode, the first valve device V1 opens its first opening V1a and closes its third opening V1c, thereby connecting the gas exhaust port O-21 of the wastewater tank 21 to the gas inlet port I-32 of the steam condensing mechanism 32. The second valve device V2 connects the gas exhaust port O-32 of the steam condensing mechanism 32 to the gas inlet port I-21 of the wastewater treatment 21. In this case, both the first pipeline L1 and second pipeline L2 are communicated, and the third pipeline L3 and the fourth pipeline LA are shut off. The wastewater collected in the wastewater tank 21 is heated to generating the steam containing water and odor substances. The steam mixture is transported from the gas exhaust port O-21 of the wastewater tank 21 through the first valve device V1 to the gas inlet port I-32 of the steam condensing mechanism 32. Water in the steam mixture input to the steam condensing mechanism 32 is condensed and precipitated out, and the dewatered steam still contains odor substances and is fed back through the second valve device V2 from the gas exhaust end O-32 of the steam condensing mechanism 32 to the gas inlet port I-21 of the wastewater tank 21. The gas fed back into the wastewater tank 21 is substantially dry, thereby facilitating an increase in the partial pressure of the water vapor in the wastewater tank 21, thereby promoting evaporation of the wastewater.

Figure 21B:
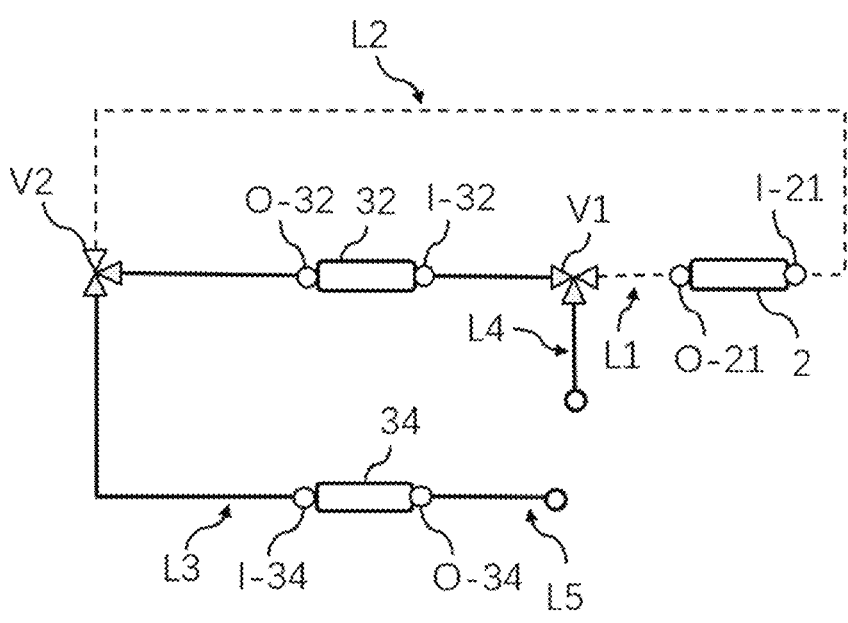

FIG. 21B illustrates a basic air-water generation mode for the docking station 100.

In this mode, the first valve device V1 opens its third opening V1c and closes its first opening V1a, thereby connecting the external environment to the gas inlet port I-32 of the steam condensing mechanism 32. The second valve device V2 connects the gas exhaust port O-32 of the steam condensing mechanism 32 to the gas inlet port I-34 of the gas heating mechanism 34. In this case, both the first pipeline L1 and second pipeline L2 are shut off, and the third pipeline L3 and the fourth pipeline L4 are communicated. The water-containing air originating from the external environment is transported via the fourth pipeline L4 through the first valve device V1 to the gas inlet port I-32 of the steam condensing mechanism 32. Water in the air input to the steam condensing mechanism 32 is condensed and precipitated out, and the dewatered air is substantially free of odor substances and is transported from the gas exhaust end O-32 of the steam condensing mechanism 32 through the second valve device V2 to the third pipeline L3 and is reheated by the gas heating mechanism 32 connected in series in the third pipeline L3. The reheated gas is discharged from the gas exhaust port O-34 of the gas heating mechanism 34 to the external environment.

Figure 21C:
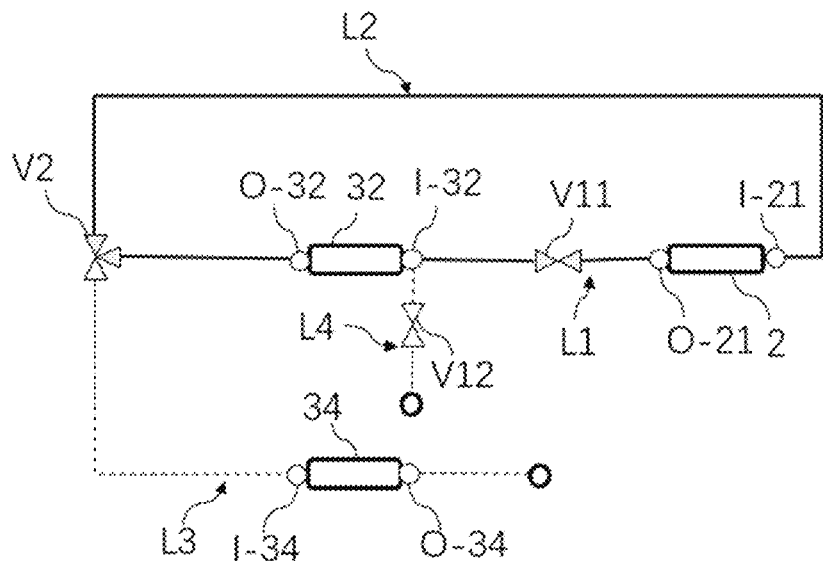

FIG. 21C illustrates a variant of the basic wastewater-water generation mode for the docking station 100.

Unlike FIG. 21A, the first valve device V1 is constructed as a combination of two two-way valves, e.g., a first two-way valve V11 connecting the gas outlet port O-21 of the wastewater tank 21 to the gas inlet port I-32 of the steam condensing mechanism 32 and a second two-way valve V12 connecting the external environment to the gas inlet port I-32 of the steam condensing mechanism 32. In this mode, the first two-way valve V11 is opens and the second two-way valve V12 is closed, thereby connecting the gas exhaust port O-21 of the wastewater tank 21 to the gas inlet port I-32 of the steam condensing mechanism 32. The second valve device V2 connects the gas exhaust port O-32 of the steam condensing mechanism 32 to the gas inlet port I-21 of the wastewater treatment 21. In this case, both the first pipeline L1 and second pipeline L2 are communicated, and the third pipeline L3 and the fourth pipeline L4 are shut off. The wastewater collected in the wastewater tank 21 is heated to generating the steam containing water and odor substances. The steam mixture is transported from the gas exhaust port O-21 of the wastewater tank 21 through the first valve device V1 to the gas inlet port I-32 of the steam condensing mechanism 32. Water in the steam mixture input to the steam condensing mechanism 32 is condensed and precipitated out, and the dewatered steam still contains odor substances and is fed back through the second valve device V2 from the gas exhaust end O-32 of the steam condensing mechanism 32 to the gas inlet port I-21 of the wastewater tank 21.

Figure 21D:
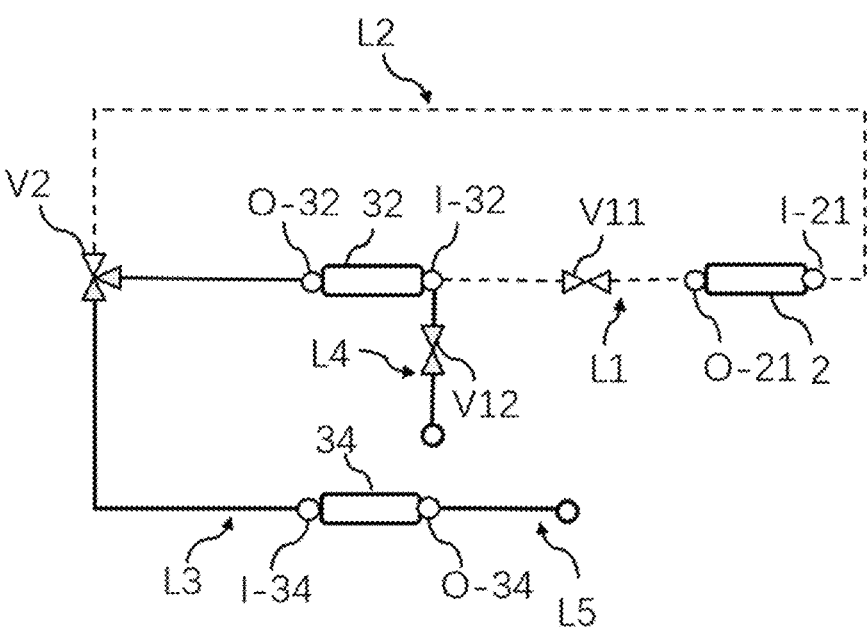

FIG. 21D illustrates a variant of the basic air-water generation mode for the docking station 100.

Unlike FIG. 21B, the first valve device V1 is constructed as a combination of two two-way valves, e.g., a first two-way valve V11 connecting the gas outlet port O-21 of the wastewater tank 21 to the gas inlet port I-32 of the steam condensing mechanism 32 and a second two-way valve V12 connecting the external environment to the gas inlet port I-32 of the steam condensing mechanism 32. In this mode, the first two-way valve V11 is closed and the second two-way valve V12 is opened, thereby connecting the external environment to the gas inlet port I-32 of the steam condensing mechanism 32. The second valve device V2 connects the gas exhaust port O-32 of the steam condensing mechanism 32 to the gas inlet port I-34 of the gas heating mechanism 34. In this case, both the first pipeline L1 and second pipeline L2 are shut off, and the third pipeline L3 and the fourth pipeline L4 are communicated. The water-containing air originating from the external environment is transported via the fourth pipeline L4 through the first valve device V1 to the gas inlet port I-32 of the steam condensing mechanism 32. Water in the air input to the steam condensing mechanism 32 is condensed and precipitated out, and the dewatered air is substantially free of odor substances and is transported from the gas exhaust end O-32 of the steam condensing mechanism 32 through the second valve device V2 to the third pipeline L3 and is reheated by the gas heating mechanism 32 connected in series in the third pipeline L3. The reheated gas is discharged from the gas exhaust port O-34 of the gas heating mechanism 34 to the external environment.

Figure 21E:
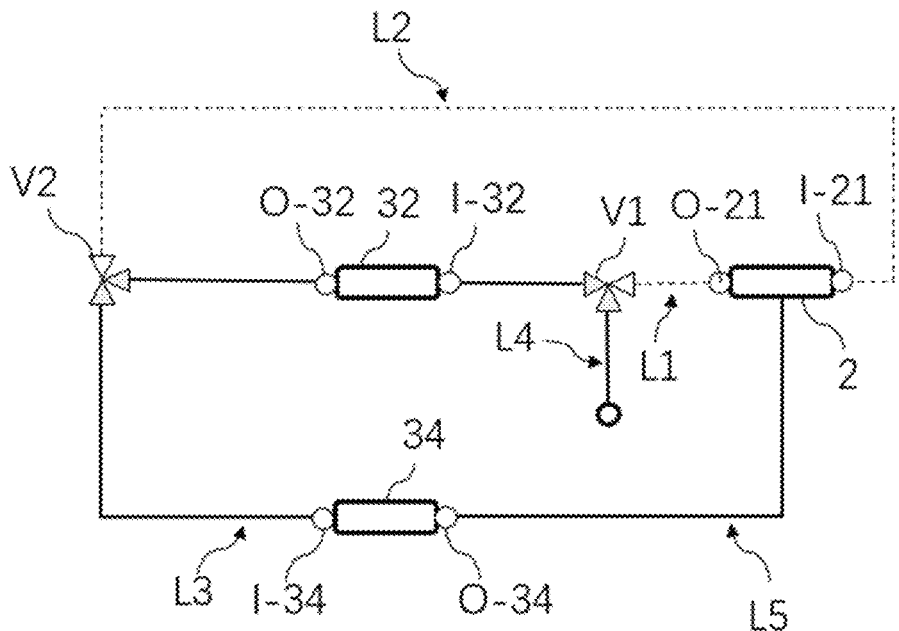

FIG. 21E illustrates an air-water generation and wastewater-heating mode for the docking station 100.

In this mode, the first valve device V1 opens its third opening V1c and closes its first opening V1a, thereby connecting the external environment to the gas inlet port I-32 of the steam condensing mechanism 32. The second valve device V2 connects the gas exhaust port O-32 of the steam condensing mechanism 32 to the gas inlet port I-34 of the gas heating mechanism 34. In this case, both the first pipeline L1 and second pipeline L2 are shut off, and the third pipeline L3 and the fourth pipeline L4 are communicated. The water-containing air originating from the external environment is transported via the fourth pipeline L4 through the first valve device V1 to the gas inlet port I-32 of the steam condensing mechanism 32. Water in the air input to the steam condensing mechanism 32 is condensed and precipitated out, and the dewatered air is substantially free of odor substances and is transported from the gas exhaust end O-32 of the steam condensing mechanism 32 through the second valve device V2 to the third pipeline L3 and is reheated by the gas heating mechanism 32 connected in series in the third pipeline L3. The reheated gas is transported from the gas exhaust port O-34 of the gas heating mechanism 34 to the fifth pipeline L5. The fifth line L5 is connected to the gas exhaust port O-34 of the gas heating mechanism 34 at one end and to the wastewater tank 21 at the other end, so as to deliver the reheated gas discharged from the gas heating mechanism 34 to the wastewater tank 21 and to keep the wastewater tank 21 warm.

Figure 21F:
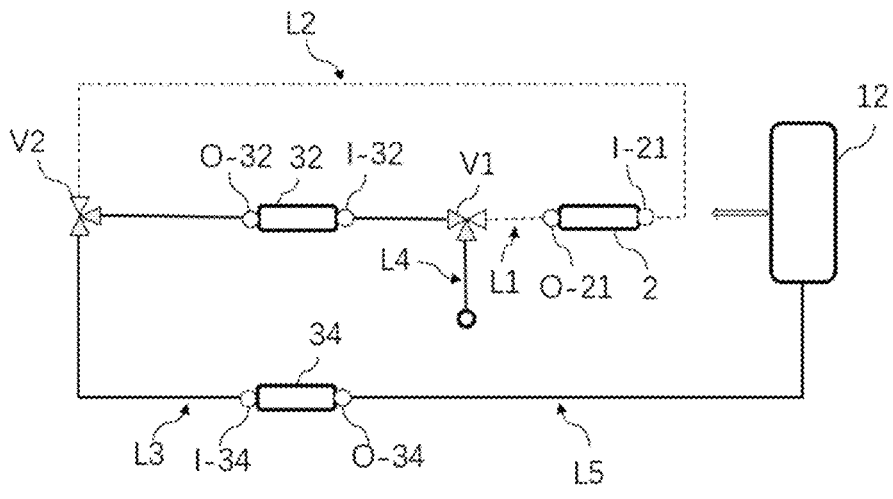

FIG. 21F illustrates an air-water generation and waste heat-drying mode for the docking station 100.

In this mode, the first valve device V1 opens its third opening V1c and closes its first opening V1a, thereby connecting the external environment to the gas inlet port I-32 of the steam condensing mechanism 32. The second valve device V2 connects the gas exhaust port O-32 of the steam condensing mechanism 32 to the gas inlet port I-34 of the gas heating mechanism 34. In this case, both the first pipeline L1 and second pipeline L2 are shut off, and the third pipeline L3 and the fourth pipeline L4 are communicated. The water-containing air originating from the external environment is transported via the fourth pipeline L4 through the first valve device V1 to the gas inlet port I-32 of the steam condensing mechanism 32. Water in the air input to the steam condensing mechanism 32 is condensed and precipitated out, and the dewatered air is substantially free of odor substances and is transported from the gas exhaust end O-32 of the steam condensing mechanism 32 through the second valve device V2 to the third pipeline L3 and is reheated by the gas heating mechanism 32 connected in series in the third pipeline L3. The reheated gas is transported from the gas exhaust port O-34 of the gas heating mechanism 34 to the fifth pipeline L5. The wash device 1 also comprises a drying section 12. The fifth line L5 is connected to the gas exhaust port O-34 of the gas heating mechanism 34 at one end and to the drying section 12 of the wash device 1 at the other end, so as to deliver the reheated gas discharged from the gas heating mechanism 34 to the drying section 12 and dry the mopping pads placed therein. The drying section 12 may be integrated within the wash tank 10; alternatively, the drying section 12 may be constructed as a separate section relative to the wash tank 10.

Figure 21G:
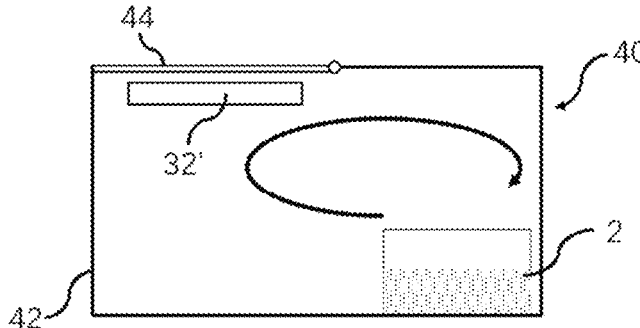
FIGS. 21G and 21H show the docking station according to another embodiment of the present disclosure.
Figure 21H:
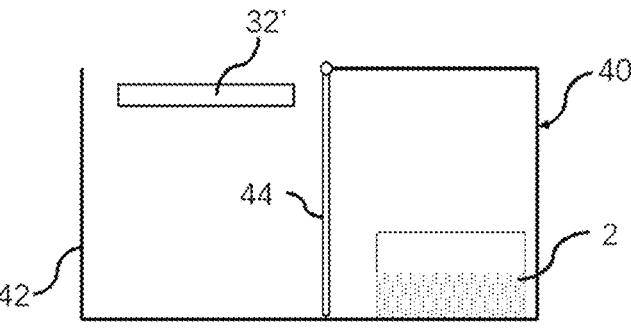

FIGS. 21G and 21H show partial exemplary schematic diagrams of the docking station according to another embodiment of the present disclosure.

The docking station of this embodiment differs from the preceding embodiment mainly in the wastewater treatment device 2 and the steam condensing mechanism 32', wherein the wastewater treatment device 2 and the steam condensing mechanism 32' are arranged in a common housing 40 comprising a main body 42 and a cover plate 44.

The cover plate 44 is reversibly connected to the main body 42 and is capable of switching between a closed state shown in FIG. 21G and an open state shown in FIG. 21H. The cover plate 44 is for example plate-like constructed and attached to the top of the main body 42 by means of a hinge 46.

In the closed state, the cover plate 44 covers an opening at the top of the main body 42, so that a space closed with respect to the external environment is defined by the cover plate 44 and the main body 42, in which the wastewater treatment device 2 and the steam condensing mechanism 32' are arranged. The wastewater contained in the wastewater treatment device 2 is heated so as to generate steam comprising water and odor substances. The steam escapes from an opening of the wastewater treatment device 2 and condenses at the steam condensing mechanism 32'. The condensate is collected, and the condensed steam is fed back to the wastewater treatment device 2 without being released into the external environment. A wastewater-water generation mode is thus realized.

The open state is reached when the cover plate 44 is pivoted around the hinge 46 to the position shown in FIG. 21H, wherein the cover plate 44 no longer covers the opening of the housing 40, but divides the housing 40 into two sub-regions separated from each other by means of the cover plate 44. The steam condensing mechanism 32' is arranged in the sub-region shown on the left side of the figure, and the wastewater treatment device 2 is arranged in the sub-region shown on the right side of the figure, wherein the sub-region in which the wastewater treatment device 2 is situated is isolated from the external environment. As a result, the steam generated by the wastewater treatment device 2 which contains odorant substance cannot be discharged to the external environment. At the same time, the steam condensing mechanism 32' may be connected to the rest of the docking station, thus allowing operation in the air-water generation mode.

Figure 22A:
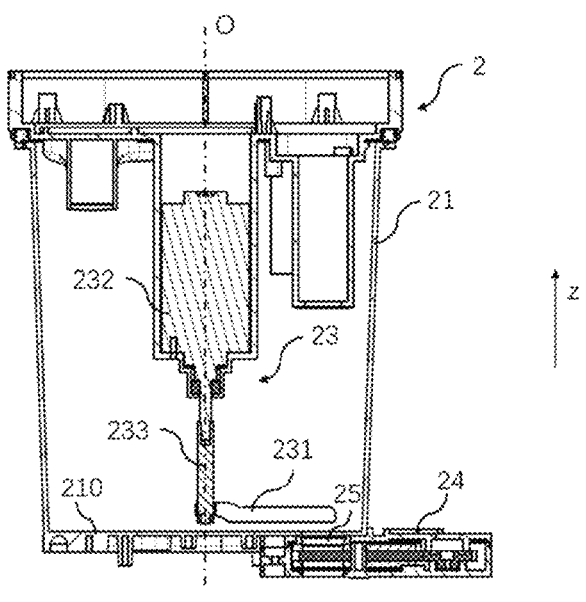
FIG. 22A shows a wastewater treatment device according to an embodiment of the present disclosure, wherein a drain port is closed.

FIG. 22A schematically illustrates the wastewater treatment device 2 according to an embodiment of the present disclosure. The wastewater treatment device 2 comprises a wastewater tank 21 and a heater not specifically shown, wherein the wastewater generated during the wash of mop is accommodated in the wastewater tank 21, and the heater is arranged under the wastewater tank 21, thereby by means of the heater heating the wastewater tank 21 to promote evaporation of the wastewater. The wastewater tank 21 further comprises a drain port 25 arranged at the bottom thereof and a drain valve 24 configured at the drain port, by means of which dry debris remaining at the tank bottom 210 of the wastewater tank 21 after the wastewater has been evaporated to dryness may be discharged, and by means of a switch of the drain valve 214 the drain port 25 is operable of switching between an open state and a closed state. When there is no need to discharge the dry debris through the drain port 25, the drain port 25 is in the closed state to seal the liquid, as shown in FIG. 22A; whereas it switches to the open state to allow the drain port 25 when the drain valve 24 is open, thereby discharging the dry debris, as shown in FIG. 22B.

The drain valve 24 may be constructed in a variety of ways. For example, in one embodiment, the drain valve 25 comprises a sealing plate movably inserted in the tank bottom 210 of the wastewater tank 21, with the aid of which movement of the sealing plate may obscure or release the drain port 25, thereby allowing the drain port 25 to switch between its open state and its closed state. Unlike the prior art, the drain port 25 is provided at the tank bottom 210 rather than at the top of the wastewater tank 21. This avoids the entry of dirt into the gas passage when discharging it out of the drain port 25, and thus avoids the escape of odorous substances.

Figure 23:
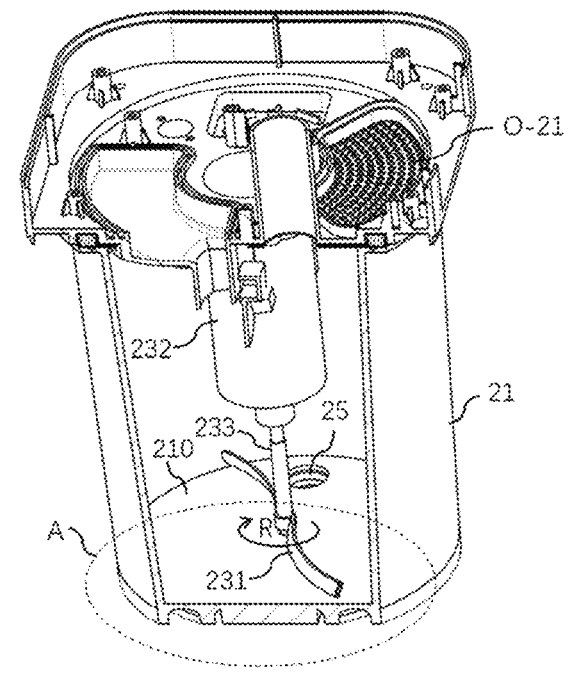
FIG. 23 shows a partial cross-sectional three-dimensional view of a wastewater treatment device according to an embodiment of the present disclosure.

The wastewater treatment device 2 comprises a waste crushing mechanism 23 provided to the wastewater tank 21 comprising a set of rotating blades 231 and an electric actuator 232 for driving the rotating blades 231. As shown in FIG. 23, a rotation shaft 233 having a rotation axis O extend from the electric actuator 232, the rotation blade 231 is connected to a free end of the rotation shaft 233. Agitation the wastewater accommodated in the wastewater tank 21 by rotation of the rotating blades 231 facilitates, on the one hand, evaporation of the wastewater and, on the other hand, stirring up the solid dirt contained in the wastewater to be easily discharged through the drain port 25 which is in the open state.

Figure 22B:
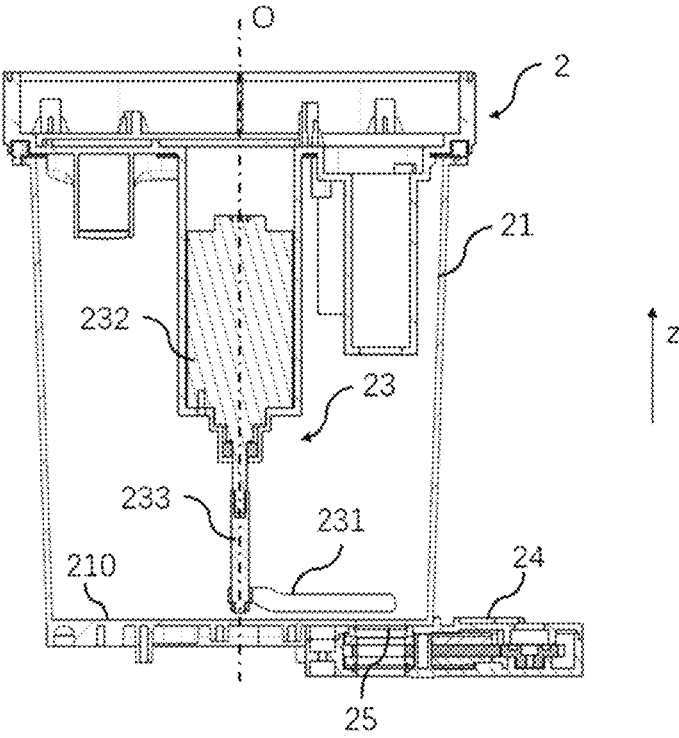
FIG. 22B shows a wastewater treatment device according to an embodiment of the present disclosure, wherein a drain port is open.

According to the embodiment as shown in FIG. 22A and FIG. 22B, the waste crushing mechanism 23 comprises only one rotation blade 231, whereas in the embodiment shown in FIGS. 23 to 27, two rotating blades 231 in a rotationally symmetrical arrangement may be provided. In embodiments not shown, however, a greater number of rotation blades may be provided. For example, three rotation blades arranged rotational symmetrically at an angular distance of 120° are provided.

Figure 24:
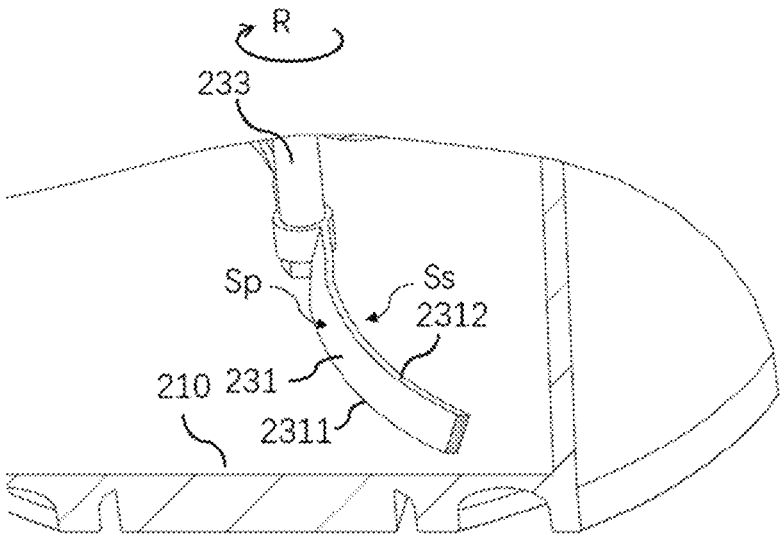
FIG. 24 schematically shows an enlarged view of region A shown in FIG. 23.

During normal operation of the waste crushing mechanism 23, the electric actuator 232 drives the rotation blade 231 to rotate in a rotation direction R, wherein a side of the rotation blade 231 disposed at the front along the rotation direction R constitutes a pressure side Sp, and a side disposed at the rear constitutes the suction side Ss. As shown in FIG. 24, the rotation blade 231 is pre-curved constructed and comprises a leading edge 2311 disposed forwardly along the rotation direction R and a trailing edge 2312 disposed rearwardly along the rotation direction R, wherein the leading edge 2311 is disposed lower than the trailing edge 2312 in a height direction z. The rotation blade 231 is thereby oriented inclined, rather than vertically, with respect to the tank bottom 210, wherein, on the pressure side Sp of this rotation blade 231, a straight line passes through the leading edge 2311 and the trailing edge 2312 forms a tilt angle α with respect to the tank bottom 210, which tilt angle α is obtuse angle greater than 90°. In the closed state of the drain port 25 shown in FIG. 22A, the wastewater contained in the wastewater tank 21 is heated for evaporation. Resistance during rotation of the rotation blade 231 is appropriately reduced due to such inclined orientation of the rotation blade 231, and the fluid below is effectively pushed upwardly to form turbulence, thereby improving the evaporation efficiency. In the open state of the drain port 25 shown in FIG. 22B, the wastewater has been substantially vaporized. During rotation of the rotary blade 231, the rotary blade 231 is inserted like a shovel with its leading edge 2311 into the dried waste deposited on the tank bottom 210, thereby churning the waste particularly effectively.

Figure 25:
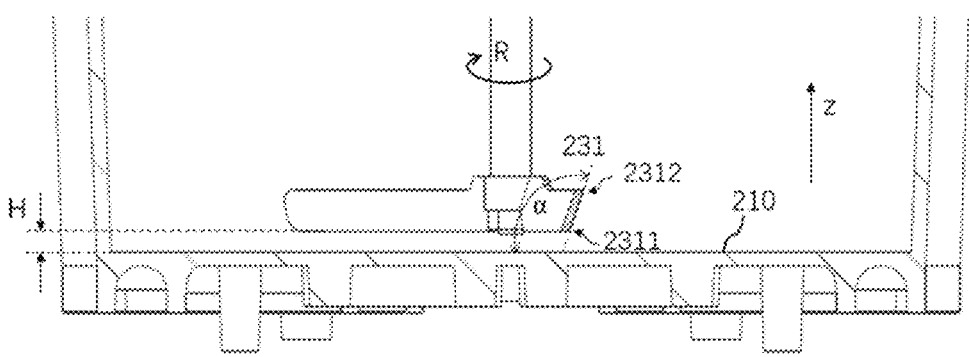
FIG. 25 schematically shows a side view of region A shown in FIG. 23.

A bottom of the rotating blade 231 may be constructed flat so as to have a lower edge extending parallel to the tank bottom 210. As shown in FIG. 25, the lower edge also forms a leading edge 2311 of the rotation blade 231. The leading edge 2311 may comprise an edge segment for shoveling dry debris deposited in the wastewater tank 21. The edge segment may comprise a smaller thickness than a main body of rotation blade, thereby enabling more efficient shoveling of dry debris. A spacing H between the leading edge 2311 and the tank bottom 210 is from 0 to 5 mm. For example, the spacing H may be set to 3.3 mm. The spacing H should not be set appropriately, thereby not only preventing movement interference between the rotation blade 231 and the tank bottom 210, but also ensuring that the rotation blade 231 is able to sufficiently and thoroughly remove dried waste that collects on the tank bottom 210.

Figure 26:
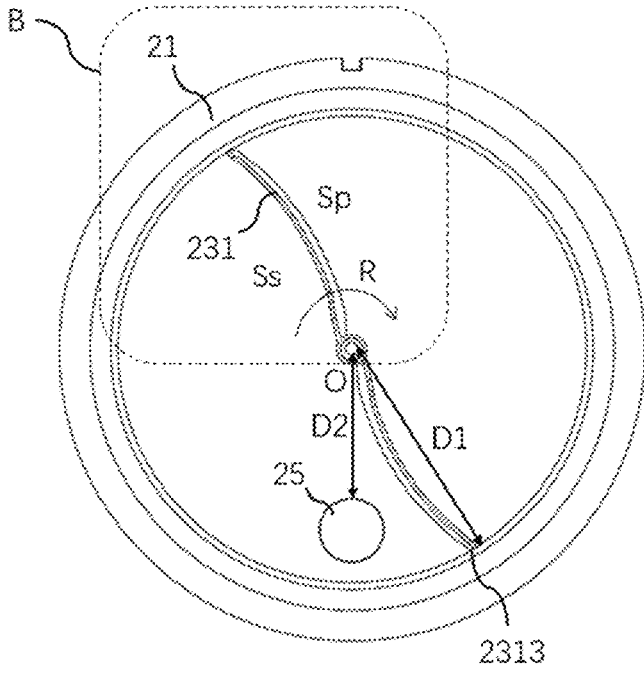
FIG. 26 shows a top view of a wastewater treatment device according to an embodiment of the present disclosure.
Figure 27:
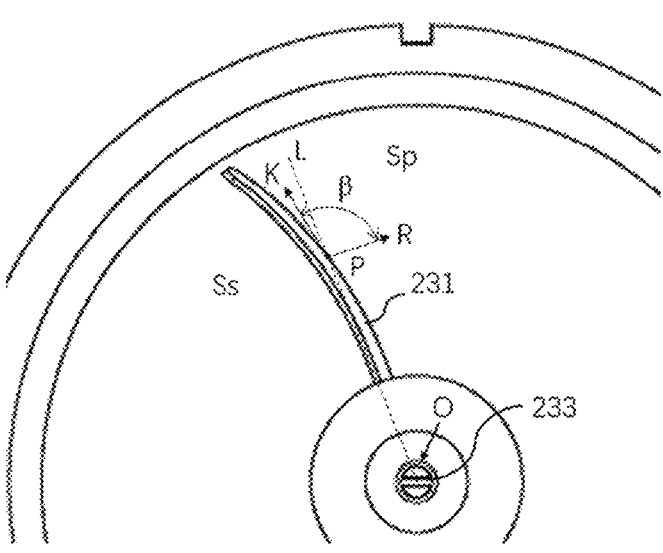
FIG. 27 schematically shows an enlarged view of region B of FIG. 26.

As shown in FIG. 26 and FIG. 27, the waste crushing mechanism 23 is centrally arranged in the wastewater tank 21. The rotation shaft 233 with the rotation axis O is particularly centrally arranged with respect to the tank bottom 210. The drain port 25 is arranged close to edge of the tank bottom 210 and has a circular cross-section. A tip 2313 of the rotation blade 231 extends to the edge of the tank bottom 210 and has a distance D1 from the rotation axis O. There is provided a minimum distance D2 between the drain port 25 and the rotation axis O. Obviously, the minimum distance D2 between the discharge port 25 and the rotation axis O is less than the distance D1 between the tip 2313 of the rotation blade and the rotation axis O. As a result, an operating range of the rotation blade 231 covers the drain port 25, so that the waste deposited on the tank bottom 210 may be effectively collected and discharged from the drain port 25.

In order to further thoroughly remove waste from the entire tank bottom 210, the rotation blade 231 is constructed convexly on its pressure side Sp. As shown in FIG. 27, with respect to any point P of the pressure side Sp of the rotation blade 231, a straight line L is obtained by connecting the point P to the rotation axis, and a tangent line in direction K is passed through the point P. Direction perpendicular to the straight line L is the rotation direction R at the point P, wherein an angle β is formed between the rotation direction R and the tangent direction K of the point P which is greater than 90°. During operation of the waste crushing mechanism 23, the rotation blade 231 rotates about the rotation axis O, wherein the rotation blade 231 peels waste from the tank bottom 210 while also applying a thrust force in a radial direction outwardly on the waste, thereby pushing the waste outwardly and discharging it through the drain port 25.

During a rotation of the rotation blade 231, the rotation blade 231 rotates at a first speed, when the drain port 25 is in the closed state, and the rotation blade 231 rotates at a second speed, when the drain port 25 is in the open state, wherein the first speed is lower than the second speed. As a result, the rotation blade 231 operates at a low speed during the process of shoveling dry debris from the tank bottom 210, and at a high speed during the process of pushing the shoveled dry debris toward the drain port 25 by the rotation blade 231.

Figure 28A:
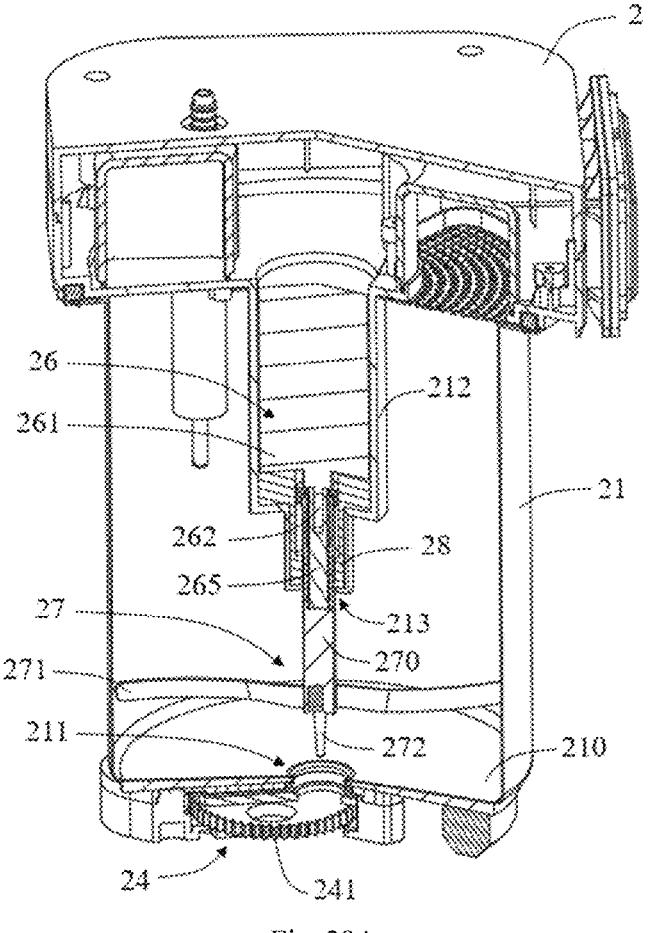
FIGS. 28A and 28B respectively show perspective sectional views of a wastewater treatment device according to the present disclosure.
Figure 28B:
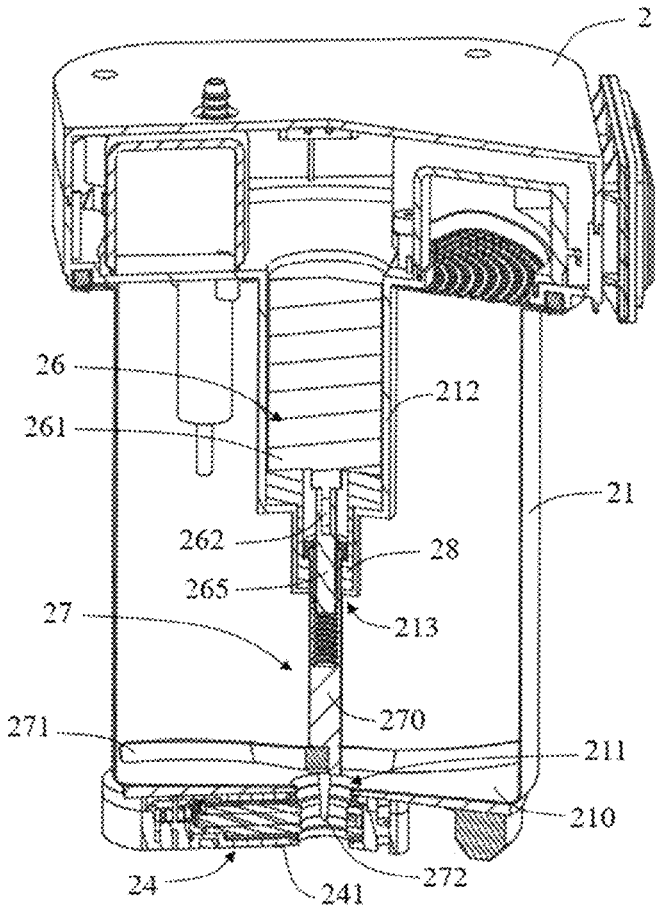

FIGS. 28A and 28B illustrate a wastewater treatment device 2 of a docking station for a cleaning robot according to an embodiment of the present disclosure. Similarly, the cleaning robot has a mopping function, and the docking station is configured to treat wastewater generated when cleaning the mopping pad on the cleaning robot. As shown in FIGS. 28A and 28B, the wastewater treatment device 2 includes a wastewater tank 21 to collect wastewater generated when cleaning the mopping pad on the cleaning robot, and the wastewater tank 21 may be heated to distill the wastewater contained therein. The water vapor generated through wastewater distillation may be condensed after leaving the wastewater tank 21 through an exhaust hole on top of the wastewater tank 21. The clean water obtained through condensation may be provided to the cleaning robot for subsequent mopping tasks. Waste generated by wastewater distillation temporarily stays in the wastewater tank 21 during the distillation process, and mainly solidifies on the tank bottom 210 of the wastewater tank 21, as described above. As shown in FIGS. 28A and 28B, the tank bottom 210 of the wastewater tank 21 is provided with a discharge opening 211 to discharge waste generated by wastewater distillation.

FIGS. 28A and 28B illustrate a wastewater treatment device 2 of a docking station for a cleaning robot according to an embodiment of the present disclosure. Similarly, the cleaning robot has a mopping function, and the docking station is configured to treat wastewater generated when cleaning the mopping pad on the cleaning robot. As shown in FIGS. 28A and 28B, the wastewater treatment device 2 includes a wastewater tank 21 to collect wastewater generated when cleaning the mopping pad on the cleaning robot, and the wastewater tank 21 may be heated to distill the wastewater contained therein. The water vapor generated through wastewater distillation may be condensed after leaving the wastewater tank 21 through an exhaust hole on top of the wastewater tank 21. The clean water obtained through condensation may be provided to the cleaning robot for subsequent mopping tasks. Waste generated by wastewater distillation temporarily stays in the wastewater tank 21 during the distillation process, and mainly solidifies on the tank bottom 210 of the wastewater tank 21, as described above. As shown in FIGS. 28A and 28B, the tank bottom 210 of the wastewater tank 21 is provided with a discharge opening 211 to discharge waste generated by wastewater distillation.

As shown in FIGS. 28A and 28B, the wastewater treatment device 2 further includes a driving mechanism 26, a waste treatment component 27 and a friction component 28, which together facilitates discharging the waste generated by wastewater distillation out of the wastewater tank 21 through the discharge opening 211. The driving mechanism 26 is arranged above the wastewater tank 21 or on top of the wastewater tank 21, for example. For example, the driving mechanism 26 includes a motor 261 fixedly mounted at the top of the wastewater tank 21 to output rotation. The motor 261 outputs rotation via an output shaft 262. In this embodiment, the driving mechanism 26 further includes a driving shaft 265, and the output shaft 262 of the motor 261 is fixedly connected to the driving shaft 265 to drive the rotation of the driving shaft 265.

As shown in FIGS. 28A and 28B, the waste treatment component 27 at least partially extends into the wastewater tank 21. For example, the waste treatment component 27 includes a rod-shaped body 270 extending substantially in the vertical direction, and at least partially extends into the wastewater tank 21 from above. The upper end of the rod-shaped body 270 is provided with a driven portion 275. As will be described in detail later, the driving shaft 265 of the driving mechanism 26 and the driven portion 275 of the waste treatment component 27 cooperate with each other so as to be movable relative to each other. With respect to the driving shaft 265, the waste treatment component 27 is configured to be movable between a first axial position and a second axial position along the central axis Lc of the driving shaft 265. In FIG. 28A, the waste treatment component 27 is located at the first axial position which is higher in the vertical direction. In FIG. 28B, the waste treatment component 27 is located at the second axial position which is lower in the vertical direction.

With continued reference to FIGS. 28A and 28B, the waste treatment component 27 includes a tip portion 272 provided at the lower end of the rod-shaped body 270. In a condition where the waste treatment component 27 in the first axial position (FIG. 28A), the tip portion 272 does not extend through the discharge opening 211. In a condition where the waste treatment component 27 is moved downward to the second axial position (FIG. 28B), the tip portion 272 at least partially extends through the discharge opening 211 to break through the waste formed at the discharge opening 211. Accordingly, the radial dimension of the tip portion 272 with respect to the central axis Lc should be smaller than the dimension of the discharge opening 211. For example, in a condition where the tip portion 272 at least partially extends through the discharge opening 211, the distance between the outer periphery of the tip portion 272 and the inner wall of the discharge opening 211 is always greater than 2 mm, so as to avoid the waste solidified at the discharge opening 211 from being squeezed between the outer surface of the tip portion 272 and the inner wall of the discharge opening 211 and hinders the movement of the waste treatment component 27. In addition, as shown in FIGS. 28A and 28B, the tip portion 272 may have a tapered shape.

With continued reference to FIGS. 28A and 28B, the waste treatment component 27 further includes at least one blade 271, such as two blades 271, fixed to the rod-shaped body 270. In a condition where the waste treatment component 27 is in the second axial position (FIG. 28B), the at least one blade 271 is close to the tank bottom 210 of the wastewater tank 21, for example, with a small distance (e.g., 4 mm) from the tank bottom 210 of the wastewater tank 21. Therefore, in a condition where the waste treatment component 27 rotates at the second axial position, the at least one blade 271 crushes the waste formed on the tank bottom 210. The crushed waste is more easily driven to the vicinity of the discharge opening 211 and discharged from the discharge opening 211.

Figure 29A:
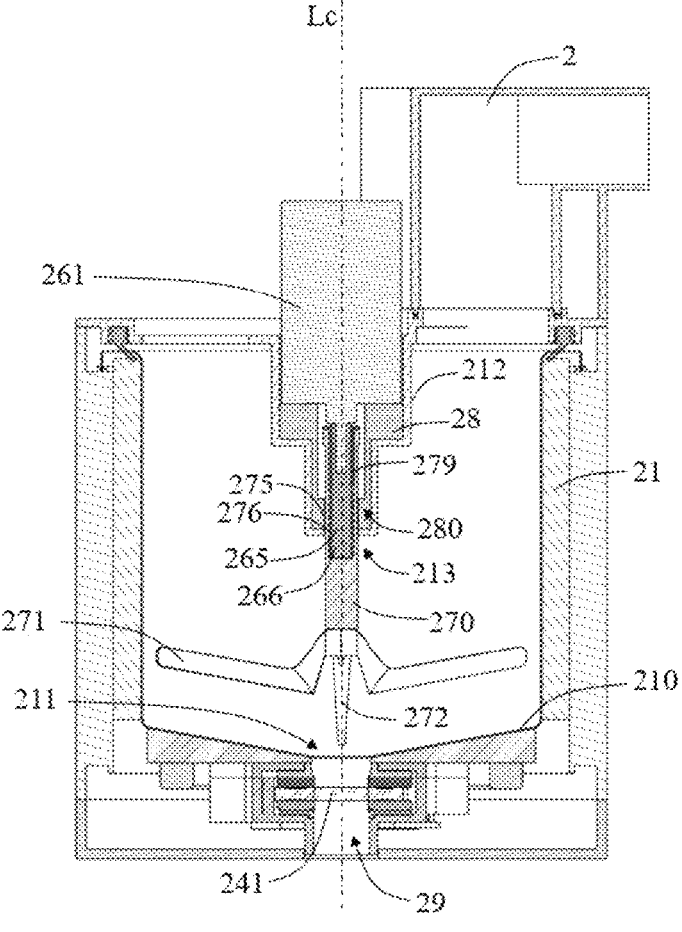
FIGS. 29A and 29B respectively show cross-sectional views of a wastewater treatment device according to the present disclosure.
Figure 29B:
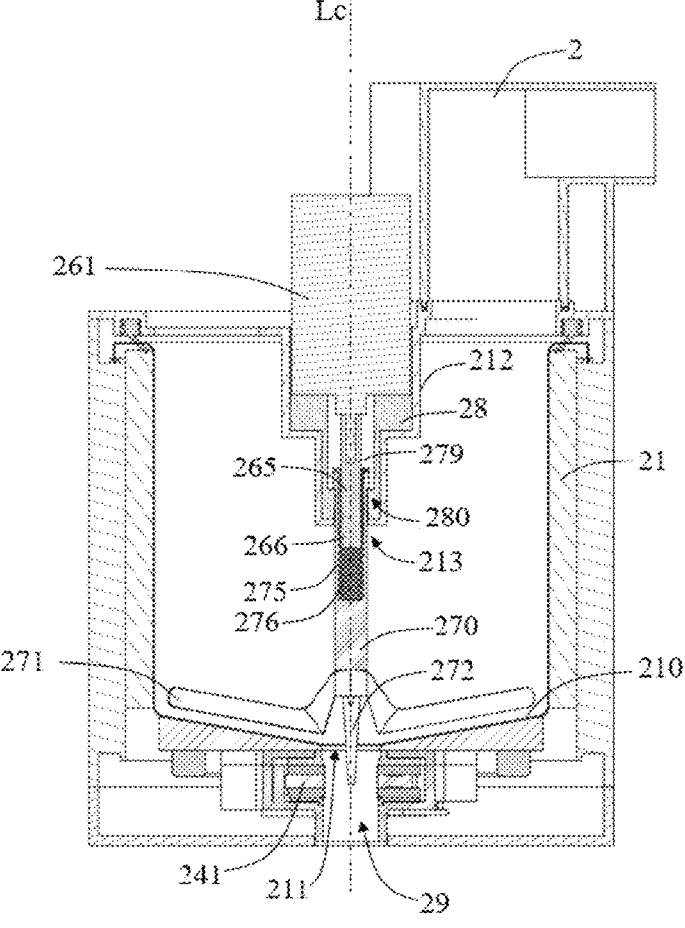

Referring to FIGS. 29A and 29B, the wastewater tank 21 further includes a discharge channel 29 communicating with the discharge opening 211 from below. That is, the discharge channel 29 is located below the discharge opening 211. Waste leaving the wastewater tank 21 from the discharge opening 211 moves away from the wastewater tank 21 via the discharge channel 29. For example, the waste enters a dust box located below the discharge channel 29. A valve 24 is provided near the discharge channel 29 to control the opening and closing of the discharge channel 29. For example, a valve element 241 of the valve 24 is provided in the discharge channel 29 to open or close the discharge channel 29. Referring also to FIGS. 28A and 28B, for example, the valve element 241 may be provided as a plate with a through hole and may translate in the plane of the plate. When the plate moves to a position where the through hole is located the discharge channel 29, the discharge channel 29 is opened. When the plate moves to a position where the through hole is no longer in the discharge channel 29, the plate blocks the discharge channel 29, and the discharge channel 29 is closed. In the process of treating wastewater, the wastewater tank 21 receives wastewater and performs distillation with the discharge channel 29 closed, and then, with the discharge channel 29 opened, the waste treatment component 27 facilitates the waste to leave the wastewater tank 21 through the discharge opening 21 and the discharge channel 29.

In FIG. 29A, the waste treatment component 27 is in the first axial position, and in FIG. 29B, the waste treatment component 27 is in the second axial position. It may be seen that, in a condition where the valve element 241 opens the discharge channel 29 and the waste treatment component 27 is in the second axial position, the lowest end of the tip portion 272 of the waste treatment component 27 is lower than a valve element height, the valve element height being the height of the valve element 241 when the valve element 241 closes the discharge channel 29. With such arrangement, the waste solidified in the discharge channel 29 during distillation may also be directly pushed by the tip portion 272.

FIGS. 29A and 29B further illustrates specific configurations of the driving shaft 265 as well as the driven portion 275 of the waste treatment component 27, which enables the waste treatment component 27 to move between the first axial position and the second axial position along the central axis Lc of the driving shaft 265.

As shown in FIGS. 29A and 29B, the driving shaft 265 and the driven portion 275 are respectively provided with threads to cooperate with each other. The end of the driving shaft 265 opposite to the motor 261 is provided with an externally threaded section 266. That is, for this section, threads are arranged outside the body of the driving shaft 265. The driven portion 275 includes an internally threaded section 276. The internally threaded section 276 is located inside the rod-shaped body 270 and extends along the longitudinal axis of the rod-shaped body 270 (for example, this longitudinal axis coincides with the central axis Lc). In other words, for the internally threaded section 276, the threads are provided on the inner surface of a hole in the rod-shaped body 270. The threads of the externally threaded section 266 and the threads of the internally threaded section 276 cooperate with each other, so that the waste treatment component 27 is able to move spirally relative to the driving shaft 265.

Figure 30A:
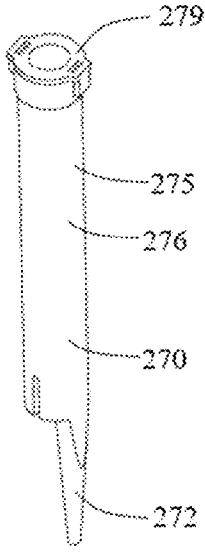
FIG. 30A shows a perspective view of a portion of a waste treatment component of a wastewater treatment device according to the present disclosure.
Figure 30B:
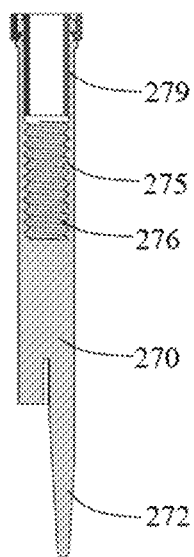
FIG. 30B shows a cross-sectional view of a portion of a waste treatment component of a wastewater treatment device according to the present disclosure.

Referring also to FIGS. 30A and 30B, according to one embodiment, a blind hole extends from the upper surface of the rod-shaped body 270 to the inside of the rod-shaped body 270, and the internally threaded section 276 is disposed at the lower part of the blind hole. Further, the externally threaded section 266 is disposed inside the internally threaded section 276. The provision of the blind hole prevents the externally threaded section 266 from moving downward beyond the internally threaded section 276, thereby preventing the waste treatment component 27 from moving upward beyond the first axial position.

With continued reference to FIGS. 30A and 30B, the longitudinal length of the externally threaded section 266 may be shorter than the length of the internally threaded section 276, for example. Thereby, the distance that the externally threaded section 266 may move relative to the internally threaded section 276 defines the distance between the first axial position and the second axial position. FIGS. 30A and 30B also show a stopper 279. The stopper 279 is fixedly arranged on top of the internally threaded section 266 for preventing the externally threaded section 266 from moving upward out of the internally threaded section 276, thereby preventing the waste treatment component 27 from moving beyond the second axial position. In particular, the stopper 279 may be made to have a lower portion placed close to the inner surface of the blind hole, and an upper portion sticking on the upper surface of the rod-shaped body 270 and around the upper opening of the blind hole. It should be noted that the blind hole arrangement and the stopper 279 in FIGS. 30A and 30B are only examples, and other components may be used to prevent the externally threaded section 266 from moving away from the two ends of the internally threaded section 276.

The wastewater treatment device 2 includes a friction component 28. In the embodiment shown in FIGS. 28A to 29B, a top plate 212 is provided at the top of the wastewater tank 21. The top plate 212 is recessed downwards in its central region to receive, on its upper surface, the friction component 28 and the motor 261. In other words, the friction component 28 is arranged on the upper surface of the top plate 212. In other embodiments not shown, the friction component 28 may also be fixed relative to the inner wall of the wastewater tank 21 in other ways. The friction component 28 is provided with a hole 280, through which the rod-shaped body 270 of the waste treatment component 27 passes. The inner surface of the hole 280 surrounds and contacts the rod-shaped body 270, thereby applying surface interaction, such as pressure and friction, to the rod-shaped body 270. In the embodiment shown in FIGS. 28A to 29B, the rod-shaped body 270 successively passes through the hole of the friction component 28 and the hole provided on the top plate 212. The inner surface of the hole on the top plate 212 may be slightly spaced from the outer surface of the rod-shaped body 270, so as to avoid friction between the inner surface of the hole on the top plate 212 and the rod-shaped body 270.

As shown in FIGS. 28A to 29B, the motor 261 is fixed at the upper part of the wastewater tank 21. Accordingly, the driving shaft 265 does not move in the vertical direction (e.g., in the direction along the central axis Lc) but only rotates, and the driven portion 275 of the waste treatment component 27 is in threaded engagement with the driving shaft 265. With such arrangement, the contact between the friction component 28 and the rod-shaped body 270 enables the driving shaft 265 to drive the waste treatment component 27 to move in translation only along the central axis Lc, which follows a mechanism of screw driving.

In other words, in a condition where the driving shaft 265 rotates in the first rotation direction, the tendency of the waste treatment component 27 to rotate about the central axis Lc in the first rotation direction is suppressed by the friction between the friction component 28 and the rod-shaped body 270, so that the waste treatment component 27 translates from the first axial position to the second axial position along the central axis Lc. In a condition where the driving shaft 265 rotates in the second rotation direction opposite to the first rotation direction, the tendency of the waste treatment component 27 to rotate about the central axis Le in the second direction is also suppressed by the friction between the friction component 28 and the rod-shaped body 270, so that the waste treatment component 27 translates from the second axial position to the first axial position along the central axis Lc. Accordingly, it is possible to transfer the rotation of the driving shaft 265 to the smooth translation of the waste treatment component 27 in a predefined range.

In addition, in a condition where the driving shaft 265 rotates in the first rotation direction and the waste treatment component 27 has reached the second axial position through translation, the driving shaft 265 may overcome the friction from the friction component 28 and drive the waste treatment component 27 to rotate together in the first rotation direction. In a condition where the driving shaft 265 rotates in the second direction and the waste treatment component 27 has reached the first axial position through translation, the driving shaft 265 may overcome the friction from the friction component 28 and drive the waste treatment component 27 to rotate together in the second rotation direction. Accordingly, with a single driving shaft 265, which is connected to a single motor 261, it is possible to not only bring the waste treatment component 27 to two different axial positions, but also to drive the waste treatment component 27 to rotate at the two axial positions. For example, the friction component 28 may be made of rubber to apply an appropriate friction to the rod-shaped body 270.

Thus, a procedure including the wastewater distillation process and the waste discharge process of the wastewater tank 21 may be provided as follows.

First, in the wastewater distillation process, the valve element 241 closes the discharge passage 29. The wastewater tank 21 is heated to distill the wastewater in the wastewater tank 21. At this time, the waste treatment component 27 is in the first axial position, and the driving shaft 265 drives the waste treatment component 27 to rotate together in the second rotational direction. Accordingly, the blades 271 of the waste treatment component 27 are at a larger distance from the tank bottom 210 of the wastewater tank 21 to stir the wastewater. The tip portion 272 of the waste treatment component 27 is away from the discharge opening 211.

After the wastewater has been distilled and waste is formed on the tank bottom 210 of the wastewater tank 21, the valve element 241 is set to open the discharge channel 29. The driving shaft 265 starts to rotate in the first rotation direction, so that the waste treatment component 27 translates downward from the first axial position to the second axial position along the central axis Lc. Later, the waste treatment component 27 starts to rotate together with the driving shaft 265 in the first rotation direction after reaching the second axial position. Thereby, the blades 271 of the waste treatment component 27 are close the tank bottom 210 of the wastewater tank 21 and crush the waste formed on the tank bottom 210 by the rotation of the blades. The tip portion 272 of the waste treatment component 27 at least partially passes through the discharge opening 211 to break through the waste formed at the discharge opening 211. Thereby, the waste leaves the wastewater tank through the discharge opening 211.

Therefore, the blades 271 and the tip portion 272, which facilitate stirring of the wastewater and crushing of the waste formed on various places in the wastewater tank 21, may be integrated into one component, and may be manufactured integrally. Further, according to the present disclosure, only one motor 261 is needed to perform the above-mentioned functions, given the motor 261 is able to rotate in opposite directions. With such configuration, less controlling effort is needed to perform the treatment process of the wastewater.

In addition, referring to FIGS. 29A and 29B, the surface of the tank bottom 210 may be formed descending toward the discharge opening 211, so that the crushed waste may move to the discharge opening 211 more easily. For example, the slope of the descending surface may be between 5 degrees and 15 degrees. Accordingly, the blades

271 of the waste treatment component 27 have a shape conforming to the tank bottom 210. According to an embodiment, the surface of the tank bottom 210 may have a conical shape descending toward the discharge opening 211. That is, the discharge opening 211 is in the center of the tank bottom 210, so that the waste formed on the entire tank bottom 210 may be cleaned.

The present disclosure may be a system, a method, and/or a computer program product at any possible technical detail level of integration. For example, the system may be a cleaning system including a cleaning robot and docking station for use with the cleaning robot. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure may include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth may also be regarded as "determining". That is, regarding "determining", several actions may be regarded as "determining".

The terms such as "connected", "coupled" or any of their variants used in the disclosure refer to any connection or combination, direct or indirect, between two or more units, which may include the following situations: between two units that are "connected" or "coupled" with each other, there are one or more intermediate units. The coupling or connection between the units may be physical or logical, or may also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims "including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A docking station for a cleaning robot, comprising:
   a wastewater treatment device constructed to collect wastewater and generate steam from the wastewater; and
   a steam condensing mechanism,
   wherein the docking station is configured to operate in an internal circulation mode and an external circulation mode, wherein in the internal circulation mode the steam generated from the wastewater treatment device is condensed at the steam condensing mechanism and the condensed steam is fed back to the wastewater treatment device without being released into an external environment of the docking station; and
   in the external circulation mode, the steam condensing mechanism receives water-containing air from the external environment and generates clean water by condensing of the water-containing air,
   and wherein the docking station is configured to switch between the internal circulation mode and the external circulation mode.

2. The docking station according to claim 1, further comprising:
   a first pipeline; and
   a second pipeline, wherein:
   a gas exhaust port of the wastewater treatment device and a gas inlet port of the steam condensing mechanism being connected in series in the first pipeline, so as to transport the steam from the wastewater treatment device to the steam condensation mechanism through the first pipeline, and
   an exhaust port of the steam condensing mechanism and a gas inlet port of the wastewater treatment device being connected in series in the second pipeline, so as to feed condensed steam from the steam condensing mechanism back to the wastewater treatment device through the second pipeline.

3. The docking station according to claim 2, wherein the first pipeline and the second pipeline are configured to being selectively communicated or shut off.

4. The docking station according to claim 2, further comprising a third pipeline, in which the steam condensing mechanism and a gas heating mechanism connected downstream of the steam condensing mechanism are connected in series, wherein the third pipeline is configured to being selectively communicated or shut off.

5. The docking station according to claim 4, further comprising a fourth pipeline connecting an external environment to the gas inlet port of the steam condensing mechanism, wherein the fourth pipeline is configured to being selectively communicated or shut off.

6. The docking station according to claim 5, further comprising a fifth pipeline, by means of the fifth pipeline the gas exhaust port of the gas heating mechanism being connected to the external environment.

7. The docking station according to claim 5, further comprising a fifth pipeline, to which the gas exhaust port of the gas heating mechanism is connected, by means of the fifth pipeline a gas heated by the gas heating mechanism being transported to the wastewater treatment device to heat the wastewater collected in the wastewater treatment device.

8. The docking station according to claim 5, further comprising a fifth pipeline, to which the gas exhaust port of the gas heating mechanism is connected, wherein the docking station further comprises a wash device having a drying section, by means of the fifth pipeline a gas heated by the gas heating mechanism being transported to the drying section.

9. The docking station according to claim 5, wherein the docking station comprises a first valve device arranged upstream of the steam condensing mechanism and a second valve device downstream thereof, wherein the first valve device is configured to connect the steam condensing mechanism to the first pipeline and to the fourth pipeline, and the second valve device is configured to connect the steam condensing mechanism to the second pipeline and to the third pipeline.

10. The docking station according to claim 9, wherein the first valve device and/or the second valve device are constructed as three-way valves.

11. The docking station according to claim 10, wherein the first valve device is configured to connect to the gas exhaust port of the wastewater treatment device, the gas inlet port of the steam condensing mechanism and the external environment.

12. The docking station according to claim 10, wherein the second valve device is configured to connect to the gas exhaust port of the steam condensing mechanism, the gas inlet port of the wastewater treatment and a gas inlet port of the gas heating mechanism.

13. The docking station according to claim 11, wherein the first valve device is constructed as a baffle mechanism comprising a first opening connected to an exhaust port of the wastewater treatment device, a second opening connected to a gas inlet port of the steam condensing mechanism, a third opening connected to an external environment, and a baffle plate pivotally supported at the third opening, wherein the baffle plate is configured to switch between a first state in which the third opening is covered and second state in which the first opening is covered.

14. The docking station according to claim 11, wherein the first valve device is constructed as a ball valve comprising a first opening connected to an exhaust port of the wastewater treatment device, a second opening connected to an air inlet end of the steam condensing mechanism, a third opening connected to the external environment, and a valve core rotatably supported at the third opening, wherein the valve core is configured to switch between a first state in which the third opening is covered and second state in which the first opening is covered.

15. The docking station according to claim 13, wherein the first opening has a smaller opening cross-section than the second opening.

16. The docking station according to claim 4, wherein in response to the first pipeline being communicated, the third pipeline is configured to be shut off.

17. The docking station according to claim 1, wherein the wastewater treatment device and the steam condensing mechanism are arranged in a common housing.

18. The docking station according to claim 17, wherein the housing comprising a main body and a cover plate switchable between a closed state and an open state, wherein in the closed state, the main body is closed by the cover plate so as to enclose the wastewater treatment device and the steam condensing mechanism in a space that is airtight relative to an external environment; and in the open state, the cover plate is isolated by means of the cover plate with respect to the steam condensing mechanism, thereby arranging the waste water treatment device in a space that is airtight with respect to the external environment.

19. The docking station according to claim 1, wherein the wastewater treatment device comprises a pressure balancing member for balance balancing a pressure between interior of the wastewater treatment device and an external environment.

20. A cleaning system, comprising:

a cleaning robot; and a docking station for the cleaning robot, comprising:

a wastewater treatment device constructed to collect wastewater generated during cleaning and generate steam from the wastewater; and a steam condensing mechanism;

wherein the docking station is configured to operate in an internal circulation mode and an external circulation mode, wherein in the internal circulation mode the steam discharged from the wastewater treatment device is condensed at the steam condensing mechanism and the condensed steam is fed back to the wastewater treatment device without being released into an external environment of the docking station; and in the external circulation mode, the steam condensing mechanism receives water-containing air from the external environment and generates clean water by condensing of the water-containing air, and wherein the docking station is configured to switch between the internal circulation mode and the external circulation mode.

* * * * *